(12) United States Patent
Siti et al.

(10) Patent No.: US 8,588,322 B2
(45) Date of Patent: Nov. 19, 2013

(54) METHOD AND DEVICE FOR SOFT-OUTPUT DETECTION IN MULTIPLE ANTENNA COMMUNICATION SYSTEMS

(75) Inventors: Massimiliano Siti, Peschiera Borromeo (IT); Teo Cupaiuolo, Milan (IT); Alessandro Tomasoni, Lesmo (IT); Sandro Bellini, Monza (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 344 days.

(21) Appl. No.: 12/875,100

(22) Filed: Sep. 2, 2010

(65) Prior Publication Data

US 2011/0058632 A1  Mar. 10, 2011

Related U.S. Application Data

(60) Provisional application No. 61/240,045, filed on Sep. 4, 2009.

(51) Int. Cl.
  *H04B 7/02*  (2006.01)
(52) U.S. Cl.
  USPC ............................ 375/267; 375/299; 375/347
(58) Field of Classification Search
  USPC .................. 375/299, 267, 347, 349, 144, 148
  See application file for complete search history.

(56) References Cited

U.S. PATENT DOCUMENTS

| | | | |
|---|---|---|---|
| 2005/0135498 A1* | 6/2005 | Yee | 375/267 |
| 2007/0011569 A1 | 1/2007 | Vila Casado et al. | |
| 2008/0310554 A1 | 12/2008 | Siti et al. | |
| 2009/0117862 A1* | 5/2009 | Le Nir et al. | 455/101 |
| 2009/0154599 A1 | 6/2009 | Siti et al. | |
| 2010/0054365 A1* | 3/2010 | Cheng et al. | 375/320 |
| 2010/0124301 A1* | 5/2010 | Bahng et al. | 375/341 |
| 2010/0290553 A1* | 11/2010 | Li et al. | 375/267 |
| 2012/0213181 A1* | 8/2012 | Walton et al. | 370/329 |

OTHER PUBLICATIONS

A. Stephens et al, "Draft Standard for [. . . ]—Part 11: Wireless LAN Medium Access Control (MAC) and Physical Layer (PHY) specifications: Amendment 5: Enhancements for Higher Throughput", IEEE P802.11n™/D8.0, Feb. 2009, pp. 556.

A. Burg, M. Wenk, W. Fichtner, "VLSI Implementation of Pipelined Sphere Decoding with Early Termination", Proc. of European Signal Proc. Conf. (EUSIPCO), 2006, pp. 5.

H. Kaeslin, "Digital Integrated Circuit Design: From VLSI Architectures to CMOS Fabrication", Cambridge University Press, 2008.

(Continued)

*Primary Examiner* — Emmanuel Bayard
(74) *Attorney, Agent, or Firm* — Graybeal Jackson LLP

(57) ABSTRACT

An embodiment of a method and device for detecting a signal and generating bit soft-output of a multiple-input multiple-output system is provided. The device includes at least one channel estimates pre-processing unit, one received vector processing and one detection and soft-output generation unit. The pre-processing unit calculates multiple QR Decompositions of the input channel estimation matrix. The detection and soft-output generation unit computes near optimal bit soft output information with a deterministic complexity and latency. It may implement a reduced complexity search method. Globally, embodiments of the invention may allow achieving low complexity, high data rate, scalability in terms of the dimension of the MIMO system and flexibility versus the supported modulation order, all potentially key factors for most MIMO wireless transmission applications.

18 Claims, 19 Drawing Sheets

(56) References Cited

OTHER PUBLICATIONS

Massimiliano Siti and Michael P. Fitz, "A Novel Soft-Output Layered Orthogonal Lattice Detector for Multiple Antenna Communications.", Proc. IEEE Int. Conf. on Communications, Jun. 2006, pp. 6.

Christoph Studer, Andreas Burg, and Helmut Bolcskei, "Soft-Output Sphere Decoding: Algorithms and VLSI Implementation", IEEE Journal on Selected Area In Communications, vol. 26, No. 2, Feb. 2008, pp. 33.

Sizhong Chen, and Tong Zhang, "Low Power Soft-Output Signal Detector Design for Wireless MIMO Communication System", ISLPED'07, Aug. 27-29, 2007, Portland, Oregon, USA, pp. 232-237.

P. Luethi, A. Burg, S. Haene, D. Perels, N. Felber and W. Fichtner, "VLSI Implementation of a High-Speed Iterative Sorted MMSE QR Decomposition" IEEE 2007, pp. 1421-1424.

Hun Seok Kim, Weijun Zhu, Jatin Bhatia, KarimMohammed, Anish Shah, and Babak Daneshrad, "Research Article—A Practical, Hardware Friendly MMSE Detector for MIMO-OFDM-Based Systems", Hindawi Publishing Corporation, EURASIP Journal on Advances in Signal Processing, vol. 2008, Article ID 267460, 14 pages.

* cited by examiner

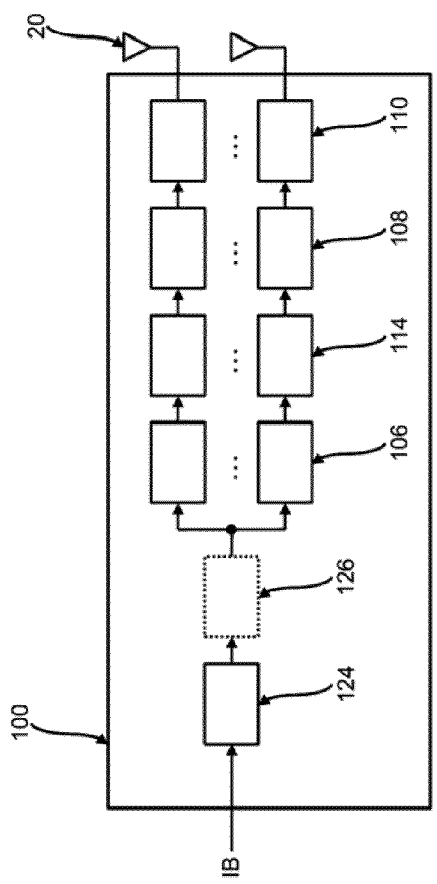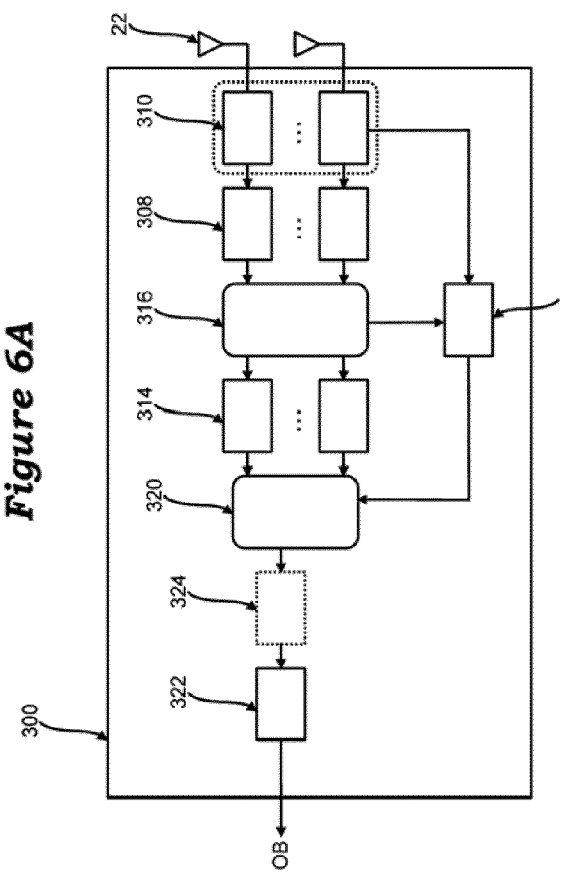
*Figure 6A*
*Figure 6B*

METHOD AND DEVICE FOR SOFT-OUTPUT DETECTION IN MULTIPLE ANTENNA COMMUNICATION SYSTEMS

PRIORITY CLAIM

The present application claims the benefit of U.S. Provisional Patent Application No. 61/240,045, filed Sep. 4, 2009, which application is incorporated herein by reference in its entirety.

TECHNICAL FIELD

An embodiment of the present invention relates generally to communication technology and more specifically to systems for detecting symbols in multiple-input multiple-output communication systems.

More specifically, an embodiment of the present invention relates to an apparatus and device for implementing in hardware systems for soft-output detection in multiple-input multiple-output communication systems.

Part of this embodiment is related to a method and apparatus for the low-complexity generation of near-optimal bit soft-output information from the reception of symbols transmitted by multiple antenna sources.

SUMMARY

Throughout this description various publications are cited as representative of related art. For the sake of simplicity, these documents will be referred by reference numbers enclosed in square brackets, e.g. [x]. A complete list of these publications ordered according to the reference numbers is reproduced in the section entitled "List of references" at the end of the description. These publications are incorporated herein.

In digital transmission systems one technique to transmit source bits is to group them into complex symbols representing the amplitude and phase of the signal modulating a frequency carrier. QAM (quadrature amplitude modulation) and PSK (phase shift keying) are examples. QAM (PSK) complex symbols are associated to $M_c$ binary bits; overall, the way the bits are associated with the $S=2^{M_c}$ complex symbols is called "mapping", while the set of symbols is called "constellation". For example, QPSK (quadrature phase shift keying) refers to 4 complex symbols representable through the two bits 00, 01, 10, 11 respectively. Similarly $M^2$-QAM constellation, e.g. 16-QAM, refers to the symbols originated by all possible groups of 4 bits 0000, 0001, 1100, etc. Complex symbols can be graphically represented in the complex plane where the two axes represent the in-phase (I) and quadrature-phase (Q) Pulse Amplitude Modulation (PAM) components of the complex symbol. FIG. 1 shows an example of QPSK constellation, and a possible received symbol.

Digital data (bits or symbols) are transmitted through physical channels that normally corrupt them because of additive noise. Moreover, in wireless systems the experienced fading channel imposes distortion (i.e. phase and amplitude changes). For these reasons the received data may not coincide with the transmitted data and an equalization technique may be required to estimate the transmitted data. Normally the channel coefficients are estimated prior to such equalization and assumed known by the equalizer. The robustness of a transmission link depends on the ability of the receiver to reliably detect the transmitted bits (i.e. transmitted 1s as 1s and 0s as 0s).

At transmitter side, encoding through error correction codes (ECCs) is a common technique to increase the robustness of the link to noise corruption. At the receiver side it implies the use of ECC decoders to correctly identify the transmitted bits.

ECC decoders may provide better performance, i.e. may be able to detect the originally transmitted bits with more reliability, if they process "soft" input bit decisions (i.e. probabilities of having received 1 or 0) rather than "hard" input (i.e. received bits already interpreted to be 1 or 0). Examples include the well-known soft-input Viterbi algorithm, Low Density Parity Check Codes (LDPCC), Turbo Codes (TC). In wireless systems, soft decisions are computed based on the received symbol, the channel coefficient estimates and the noise variance estimate.

Wireless transmission through multiple antennas, also referred to as MIMO (Multiple-Input Multiple-Output), currently enjoys great popularity because of the demand of high data rate communication from multimedia services. MIMO transmission consists of the simultaneous transmission of T complex symbols using T transmit antennas; this way a transmit data rate of T times the data rate of a single antenna system transmitting in the same bandwidth may be obtained. In this case "spatial division multiplexing" (SDM) is performed and normally receive antennas are employed.

In case of SDM MIMO systems, the sequence of T symbols simultaneously transmitted by the multiple antennas will be also referred to as transmit sequence or transmit vector (of symbols or signals). In one example each individual symbol is a sample of a PSK/QAM constellation. Similarly, the R received symbols will be referred to as a received sequence or vector. Also, R×T channel coefficients are associated with the corresponding channel links between transmit and receive antennas. They are normally estimated and grouped into a channel estimate matrix. Throughout this document the short notation T×R means a MIMO scheme featuring T transmit and R receive antennas. FIGS. 2A and 2B illustrate example systems for MIMO transmission and reception.

Then, receivers for MIMO wireless receive as input at each receive antenna a signal made of the superposition of simultaneously transmitted symbols, each signal distorted by the channel and corrupted by noise. A schematic example of MIMO system representation for two transmit and two receive antennas is shown in FIG. 3, where the multiple channel links and the related matrix H, the transmit vector X and the received vector Y, are evidenced. They satisfy the linear relationship:

$$Y = HX + N \qquad (1)$$

where N is the noise vector of additive white Gaussian noise (AWGN) samples.

It is understood that alternative way of using multiple transmit antennas is to "spatially encode" the input stream in order to increase the robustness of the link, instead of the data rate. A popular example is represented by the orthogonal space-time block codes (O-STBC) scheme specified in [1] and other standards, where the information carried by two simultaneous complex symbols is transmitted by two transmit antennas in two time instants, creating an orthogonal transmit matrix.

An interesting MIMO configuration derives from the combination of STBC and SDM (for brevity, SDM+STBC). In this case "asymmetrical" antenna configuration where T>R are used. An example is shown in FIG. 4 where T=4 and R=2 are used to detect two O-STBC streams $X_{STBC1}$ and $X_{STBC2}$. The t=2 transmission time instants are denoted as t1 and t2. Correspondingly a received matrix Y is given at the receiver side, wherein the entries have indices j,k denoting the receive antenna index and the time instant of the observation respectively. Also for SDM+STBC systems an "equivalent" SDM system can be built by grouping the symbols transmitted in more time instants into a single transmit sequence $X_{eq}$=vec(X) of size T (=4); the R symbols received in t time instants into a single received sequence $Y_{eq}$=vec(Y) of size tR (=4); and the R×T (2×4) channel matrix (considered unchanged in the t time instants) into an enlarged (tR)×T equivalent channel matrix $H_{eq}$. Then (1) is still valid provided that:

$$Y_{eq}=H_{eq}X_{eq}+N_{eq} \quad (2)$$

where $N_{eq}$=vec(N) is equivalent AWGN noise vector obtained grouping the R received samples in t time instants into a single sequence.

In the remainder of the present document reference will be made to SDM systems with no loss of generality, being intended that the methods and apparatuses described therein are suitable to receive and demodulate sequences transmitted through either SDM or SDM+STBC schemes, it being understood that equation (2) is intended to replace equation (1) in the latter case.

A fundamental function of MIMO receivers is performing "spatial equalization" meaning that starting from the input Y, and the estimates of H ($\hat{H}$), the transmit sequence X is estimated ($\hat{X}$), or "detected". A method or apparatus implementing a technique to detect a transmit sequence is called (MIMO) "detector" in the literature. If it generates bit soft output information (or log-likelihood ratios, LLRs, in the logarithmic domain), as typically required in digital communications featuring soft-input ECC decoders, then the detector is said to be a "soft output" detector (FIG. 5).

An embodiment of the present invention is concerned with a method and device for performing MIMO detection.

MIMO systems are often used in combination with multi-carrier orthogonal frequency division multiplexing (OFDM). OFDM systems correspond to dividing the overall information stream to be transmitted into many lower data rate streams, each one modulating a different sub-carrier of the main frequency carrier. Equivalently, the overall bandwidth is divided into many sub-bands centered on the sub-carriers. This operation makes data communication more robust under wireless multi-path fading channel, conditions and simplifies frequency equalization operations. OFDM systems are well known to those skilled in the art. MIMO and OFDM are key technologies for significant wireless applications of commercial interest.

Examples of typical MIMO-OFDM transmitters and receivers, including a MIMO detection apparatus, are portrayed in FIG. 6.

Among others, a significant example of a system endorsing MIMO and OFDM is provided by the next generation of Wireless Local Area Networks (WLANs), see e.g., the IEEE 802.11n standard [1]. Another candidate application is represented by mobile "WiMax" systems for fixed wireless access (FWA). Besides, 3GPP Long Term Evolution (LTE) mobile terminals will endorse MIMO technology and as such may represent a very important commercial application for the present arrangement.

The technical description throughout the present document is intended to be valid either per-carrier in the frequency domain for OFDM systems or for single carrier systems.

A potential drawback of MIMO communication receivers is a high increase in terms of computation complexity compared to single antenna systems. MIMO detection is commonly considered to be key part of MIMO receivers for its impact on performance and the high complexity cost as well.

For the above mentioned reasons, in packet-based OFDM transmissions where "packets" consisting of multiple OFDM symbols are transmitted, like those required e.g. by IEEE 802.11n, it is desired to optimize the design of the hardware (HW) MIMO detector architecture by distinguishing the processing of terms required once per packet for all OFDM data carriers (typically, processing of channel coefficients in static channels) and the processing to be repeated for every OFDM symbol in the packet (typically, processing of the received observations to perform the detection). A possibly optimum trade-off between memory usage and complexity of the design is thus desired for the design of MIMO receivers.

Maximum-Likelihood (ML) detection is often considered to be the optimal detection technique in the presence of AWGN. The "brute force" ML detector finds an estimate of the transmit sequence by searching through all the possible transmit sequences until the best match to the received sequence is found. For example, in case of MIMO transmission of symbols belonging to an S-sized PSK or QAM constellation and T transmit antennas, this corresponds to searching over $S^T$ transmit sequences; this means it becomes increasingly unfeasible with the growth of S and T, e.g. for S=64 (64-QAM) and T=2, $64^2$=4096 sequences of two symbols have to be searched in order to detect just two transmit symbols.

An embodiment of an interesting optimal (for T=2) and near-optimal (for T>2) performance MIMO detector, which significantly reduces the complexity of the search from $S^T$ to S·T, is described in the patent application [2], which is incorporated herein by reference in its entirety. The therein included equations and corresponding notation is also included here. Reference is also made to the related paper [3].

An embodiment of the present invention relates to a HW architecture design and implementation of a MIMO detector belonging to the class described in [2] and [3].

An embodiment of the present invention targets packet-based OFDM wireless systems for static channel environment and includes an optimized design trade-off between memory consumption and processing complexity which distinguishes between channel estimate processing to be performed once per packet and received vector processing to be performed for every received OFDM symbol.

However, it is understood that different repartitions between memory and processing units are possible without going beyond the scope of the present disclosure. In particular memory usage may be reduced to a minimum if rapidly varying channel environments are to be addressed as for outdoor mobile conditions. Then, it might be necessary to update channel estimate processing for every OFDM symbol instead of once per packet. Also, single carrier systems might be considered as well instead of OFDM-based ones. These cases may be considered as special cases of OFDM with one sub-carrier and as such they fall within the scope of the present disclosure.

The following description refers to the target of packet-based OFDM transmissions with no loss of generality, unless otherwise stated.

As a result of novel design features detailed in the remainder of the present document, an embodiment of the invention allows achieving low complexity, high data rate, scalability in terms of the number of transmit antennas and flexibility versus the supported modulation order, all key factors for most MIMO wireless transmission applications.

In more detail, advantages entailed by an embodiment of the present invention concern at least two main aspects, the channel processing on one hand, the demodulation and soft output (SO) generation on the other hand. In the following, a brief summary of the state of the art in the field of MIMO detection devices is drafted.

Concerning the first aspect, most algorithms for MIMO detection, ranging from suboptimal lower complexity ones to the better performing more advanced variants, include the decomposition of the channel estimation matrix H into the product of two matrices one of which is triangular.

A common efficient implementation of such decomposition is the QR Decomposition (QRD). Several efficient QRD HW architectures exist in the literature; a well-known example is the so-called Square-Root MMSE formulation.

An embodiment of the present invention is concerned with an efficient HW architecture and implementation of multiple QRDs (MQRDs), one QRD for each transmit antenna, as may be required e.g. by the SO Layered ORthogonal Lattice Detector ("LORD"). No efficient state of the art MQRD Very Large Scale Integrated (VLSI) architectures are believed to exist (prior to embodiments of such an architecture described herein).

More specifically, an embodiment includes a channel-estimate preprocessing unit, which computes MQRDs out of an R×T channel-estimate matrix H, with R≥T. The MQRDs are computed through a Gram-Schmidt orthogonalization (GSO) process detailed in [2] and implemented using an optimized complexity VLSI architecture which shares the processing of common terms among the TQRDs.

Concerning the second aspect, prior art SO near ML VLSI implementations for MIMO detection are still limited in number and commonly based on the Sphere Decoder (SD) and its variants, targeting either Application Specific Integrated Circuit (ASIC) or Field Programmable Array (FPGA) (e.g. [4], [5]).

Therefore existing designs may be affected by the issues of the non-deterministic nature of the SD algorithm and its lowly parallelizable structure, which may be intrinsically non optimal for VLSI implementations. In particular, achieving a very high data rate using high modulation orders (e.g. in the order of 64-QAM, as required by IEEE 802.11n), is still a major challenge for state of the art HW implementation of SO SD MIMO detectors.

An assessment of the complexity (in terms of chip area occupation and achievable clock frequency) associated with SO SD can be found in [4]. Such solution represents an advancement compared to previous implementations of LLRs generation, but the throughput remains SNR dependent. It may be difficult to adopt such architecture for real-time applications, where it is often preferable, if not mandatory, to have devices with fixed and guaranteed throughput. Besides only the case of 16-QAM is treated, and this may not achieve the high throughput required by many multimedia applications.

Among SO SD HW designs, [5] is based on "K-best" SD detection and is believed to be the only one able to generate soft-output for 4×4 MIMO with 64-QAM modulation order. However, the developed integrated circuit may still suffer from the main drawback of the SD algorithm, i.e. a variable run-time detection throughput and complexity depending (among other) on the SNR.

An embodiment of the present invention includes a HW unit to generate near-optimal bit soft-output information (LLRs) with a deterministic data rate and latency.

In yet another embodiment, said unit uses a method and apparatus for low-complexity bit soft-output information generation applicable to OFDM systems.

An embodiment of said method and apparatus includes:
a reduced candidate search list based on the channel fading condition;
an OFDM sub-carrier selection method to choose the sub-carriers over which to perform reduced or full search based on the fading channel conditions and HW design constraints.

Other technical features may be readily apparent from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIGS. 6A and 6B respectively illustrates a typical single-carrier MIMO transmitter and related receiver in accordance with an embodiment of this disclosure;

DETAILED DESCRIPTION

FIGS. 1 through 19 and the various embodiments described in this disclosure are by way of illustration only and should not be construed in any way to limit the scope of this disclosure. Those skilled in the art will recognize that the various embodiments described in this disclosure may easily be modified and that such modifications fall within the scope of this disclosure.

Figure 1:
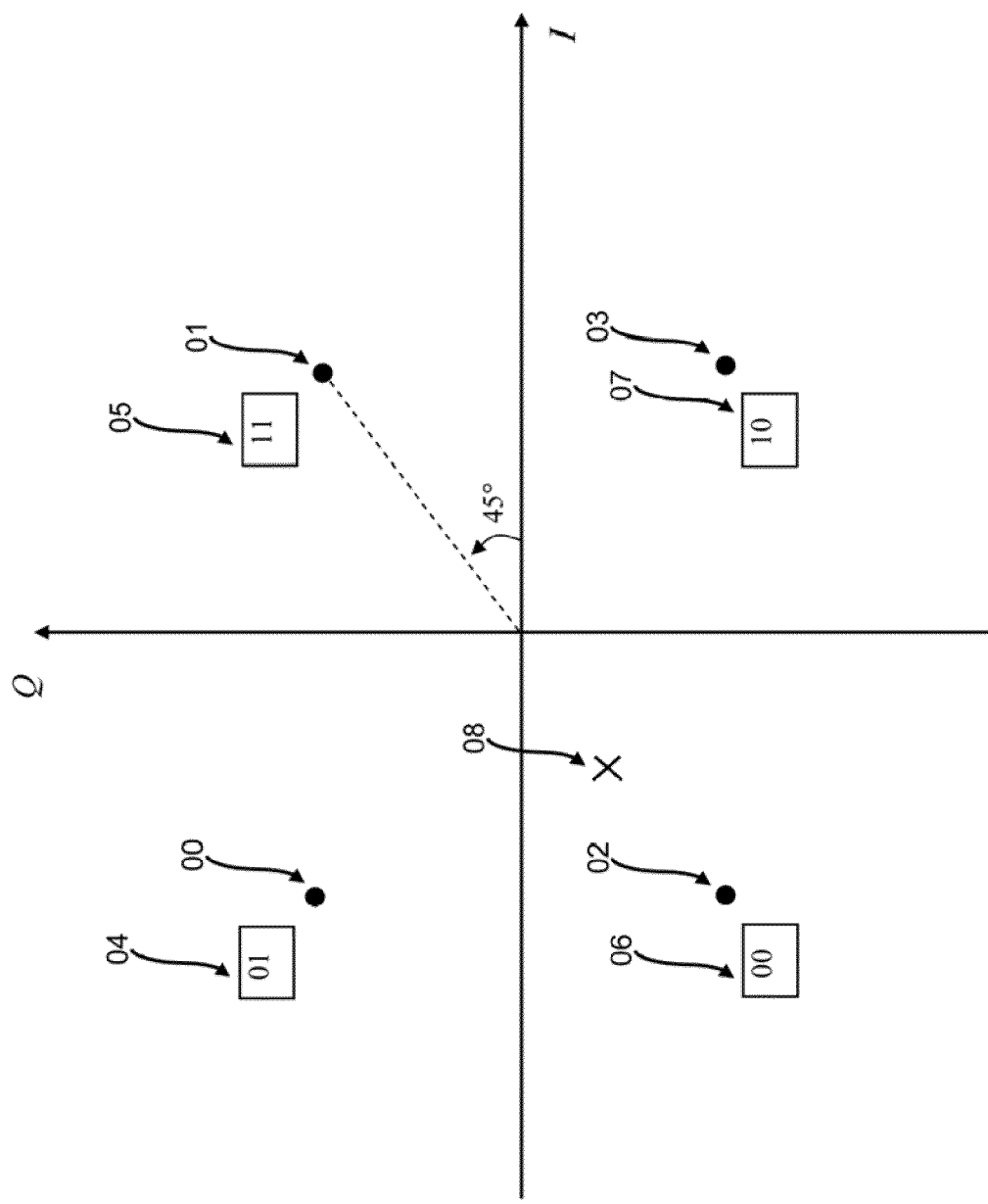
FIG. 1 illustrates an example of QAM constellation, bit mapping, and a possible received symbol in accordance with an embodiment of this disclosure.

FIG. 1 illustrates an example QPSK constellation, wherein the four constellations symbols are denoted 00 to 03. The corresponding Gray-mapped couple of bits are indicated in blocks 04 to 07. A possible received symbol 08 is also shown, which does not coincide with any transmit symbol due to the effect of noise and distortion caused by the channel.

Figure 2B:
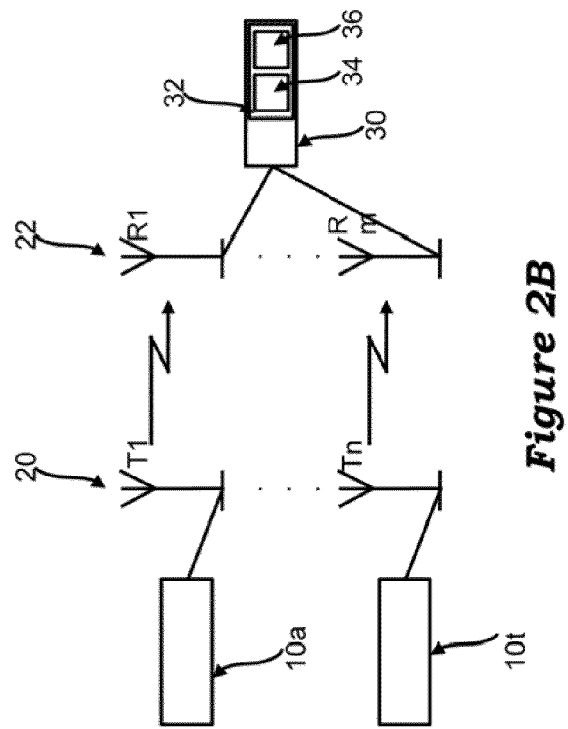
FIGS. 2A and 2B illustrate example systems for communicating and receiving from multiple sources in accordance with an embodiment of this disclosure.
Figure 2A:
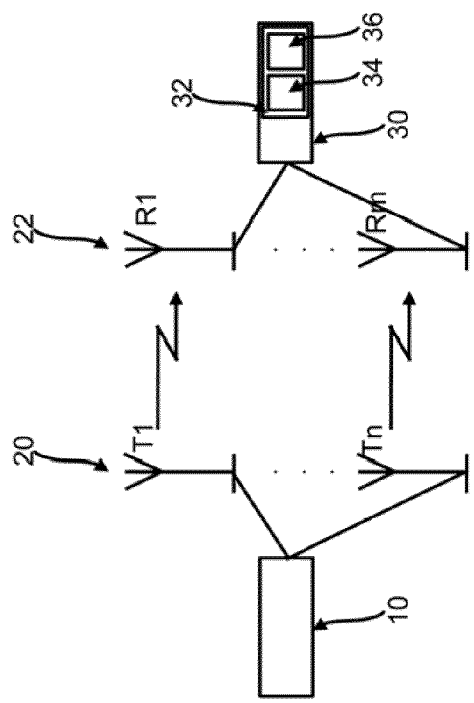

FIGS. 2A and 2B illustrate an example of MIMO systems for communicating and receiving from multiple sources in accordance with this disclosure. In particular, these embodiments are for illustration only. Other embodiments of the systems could be used without departing from the spirit and scope of this disclosure.

As shown in FIG. 2A, the system includes a transmitter 10 and a receiver 30. The transmitter 10 includes or is coupled to multiple transmit antennas 20 (denoted T1-Tn), and the receiver 30 includes or is coupled to multiple receive antennas 22 (denoted R1-Rm). Typically, each receive antenna 22 receives signals transmitted simultaneously by all of the transmit antennas 20.

As shown in FIG. 2B, the system could also include multiple transmitters 10a-10t and the receiver 30. In this example, each of the transmitters 10a-10t includes or is coupled to a respective single transmit antenna 20.

Each of the transmitters 10, 10a-10t in FIGS. 2A and 2B represents any suitable device or component capable of generating or providing data for communication. The receiver 30 represents any suitable device or component capable of receiving communicated data.

In these examples, the receiver 30 includes an iterative detector and decoder 32, which detects transmit sequences of symbols from multiple sources and wherein the detector generates near-optimal bit soft-output information exploiting also the knowledge of input soft information from the outer Soft-Input Soft-Output (SISO) ECC decoder. The multiple sources could include a single transmitter 10 with multiple antennas 20, multiple transmitters 10a-10t with one or several antennas 20 each, or a combination thereof. The iterative detector and decoder 32 may operate as described in more detail below.

The block 32 includes any hardware, software, firmware, or combination thereof for detecting multiple communications from multiple sources. The block 32 may be implemented in any suitable manner, such as by using an ASIC, FPGA, digital signal processor ("DSP"), microprocessor or combination or sub combination thereof. As a particular example, the block 32 may include one or more processors 34 and one or more memories 36 capable of storing data and instructions used by the processors 34.

Figure 3:
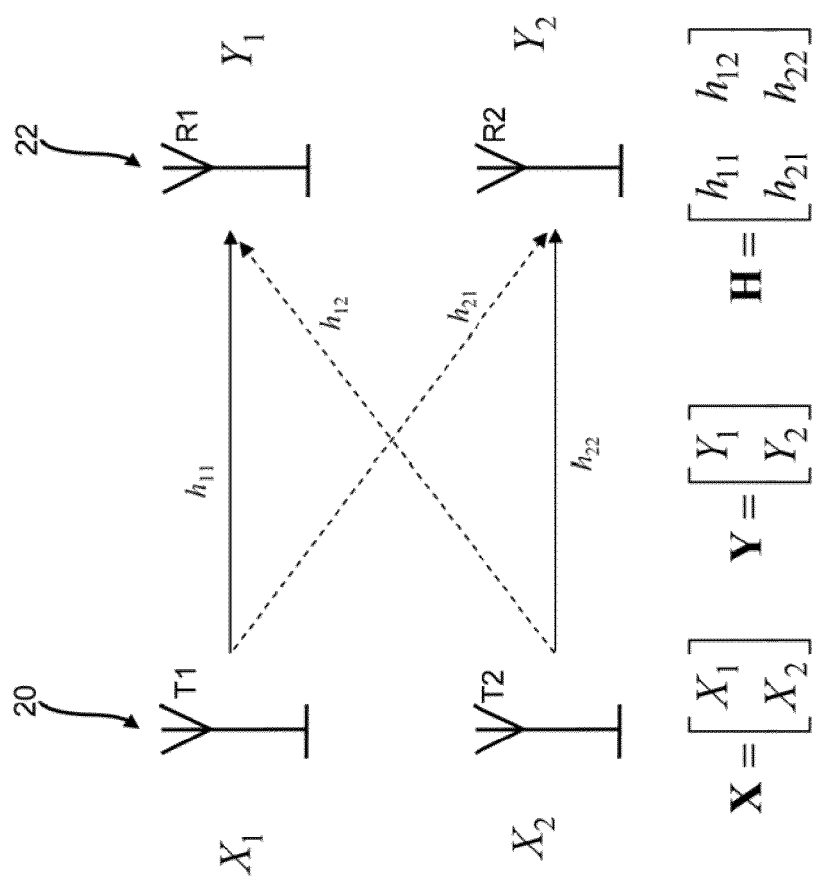
FIG. 3 illustrates a schematic MIMO SDM system representation for an embodiment with two transmit and two receive antennas.

FIG. 3 illustrates a schematic MIMO SDM system representation for two transmit and two receive antennas, in accordance with the expressions for $X=[X_1, X_2]$, $Y=[Y_1, Y_2]$ and $H=[h_{11}, h_{12}; h_{21}, h_{22}]$ reproduced therein, which may be valid either for both single-carrier flat fading MIMO systems or for wideband OFDM systems (in the latter case, per sub-carrier). The interpretation of (1) is that the signal received at each of the R antennas 22 represents the superposition of T simultaneously transmitted signals from antennas 20 corrupted by multiplicative fading and AWGN.

Figure 4:
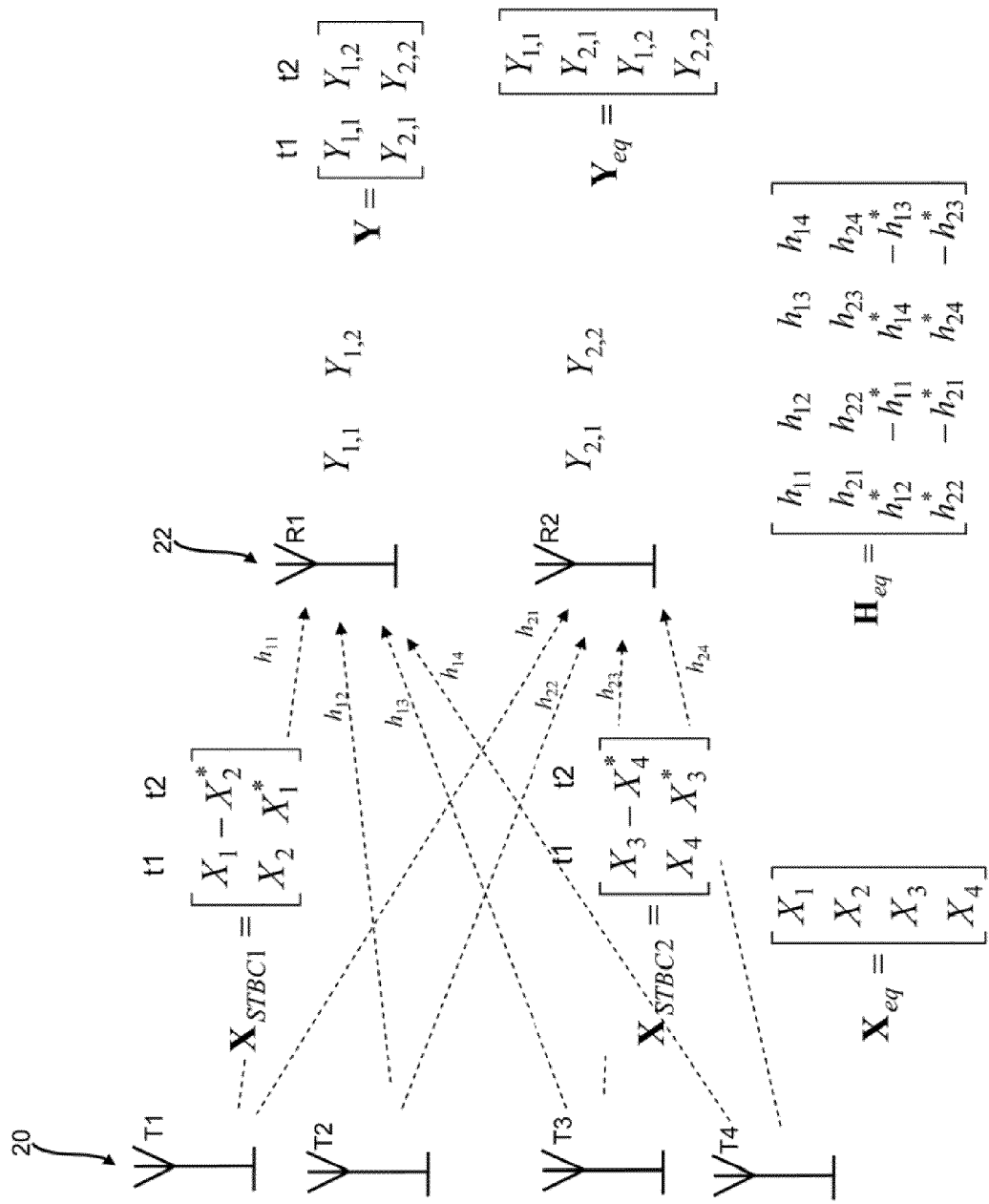
FIG. 4 illustrates a schematic MIMO SDM+STBC system representation for an embodiment with four transmit and two receive antennas.

FIG. 4 illustrates a schematic MIMO SDM+STBC system representation for four transmit and two receive antennas. The signal received at each of the R antennas 22 in two time instants t1 and t2 represents the superposition of T signals transmitted simultaneously from antennas 20 in two time instants and corrupted by multiplicative fading and AWGN. An equivalent SDM system (2) may be built for such systems in accordance with the expressions for $X_{eq}$, $Y_{eq}$, $H_{eq}$, $N_{eq}$ reproduced therein.

Figure 5:
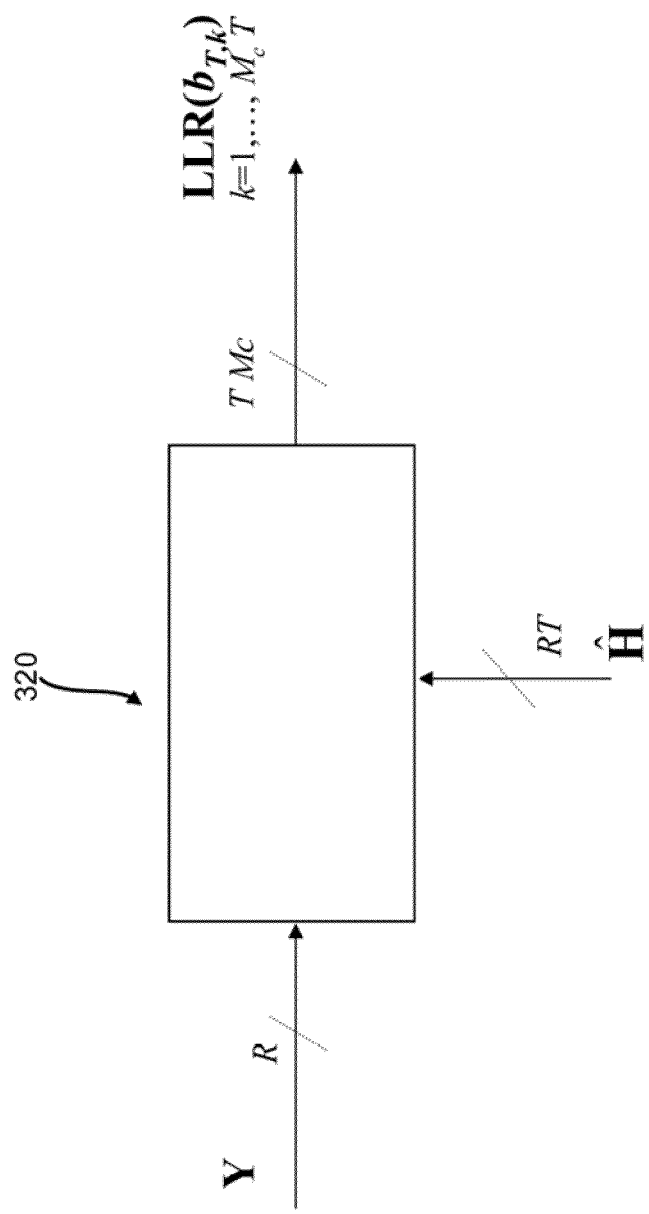
FIG. 5 illustrates an example system for a soft-output MIMO detector.

FIG. 5 illustrates an example soft-output MIMO detector 320 which outputs the bit LLRs corresponding to bits mapped onto the transmit sequence X, given as input the received sequence Y and the channel estimates $\hat{H}$.

FIGS. 6A and 6B respectively illustrate alternative embodiments of a MIMO-OFDM transmitter and receiver. Typical transmitter baseband digital elements/procedures are grouped as 100. As a counterpart, block 300 represents typical baseband elements/procedures of a receiver.

Referring to FIG. 6A and the block 100 in particular, as well known to those skilled in the art, the input bit stream IB is first processed by a Forward Error Correction (FEC) encoder 124, followed by a sequence of bit interleaver 126, a set of mapper blocks 106, framing and OFDM modulator blocks 114, filter blocks 108 and digital-to-analog (D/A) converters 110 for transmission over the set of transmission antennas 20.

Referring to FIG. 6B, similarly the block 300 has additionally associated there with a set of analog-to-digital (A/D) converters 310 and filter blocks 308 for each of the antennas 22 of the receiver. A typical receiver further includes a synchronization block 316 for enabling a coherent channel estimation by the block 312. Those skilled in the art will appreciate the presence of the OFDM demodulator and deframing blocks 314 which, together with the channel estimator 312, provide input data to the MIMO detector 320. A receiver typically further includes a deinterleaver 324, a FEC decoder 322, providing the final output bit stream OB. Deinterleaver 324 implements the reciprocal permutation law of blocks 126.

Any synchronization block 316 and any channel estimator 312 may be used, and any FEC code might be used in the FEC encoder 124 and FEC decoder 326, such as e.g., Reed-Solomon, convolutional, LDPCC, and TC schemes.

Again, these embodiments are for illustration only. Other embodiments of the systems 100, 300 may be used without departing from the scope of this disclosure.

An embodiment of the present invention relates to a HW architecture design and implementation of a MIMO detector 320 that implements the functions described in [2].

For example purposes, the remainder of the description will refer to QAM constellations with $S=M^2$ symbols (in short, $M^2$-QAM) though it is intended that the description would remain valid for PSK constellations as well.

It is noted that here and throughout this document reference will be made to the term reference layer, meaning that the reference antenna or layer is the one that transmits the last symbol $X_T$ in the symbol sequence X of (1). It is also recalled from [2] that the detection processing is to be repeated T times, requiring T linear transformations of the type $R_j = A_j H_j$, $j=1, \ldots, T$ of as many column-wise re-ordered versions ($H_j$) of the channel estimate matrix H, where $A_j$ is a matrix converting $H_j$ in a triangular matrix $R_j$, the ordering of the columns of $\hat{H}_j$ corresponds to an ordering of the transmit symbols in the sequence $X_j$, and each ordering differs from the other for the index value in the last position, i.e. all T layers become in turn the reference layer in one sequence $X_j$ once and only once.

Low Complexity Search Demodulation and Bit Soft Output Generation Method

An embodiment of a method and apparatus for a low complexity search (LCS) demodulation and near optimal bit soft output information generation, applicable to OFDM-based systems, is described.

More specifically, an embodiment of a method to reduce the cardinality of the QAM symbol sets $S(k)_T^+$, $S(k)_T^-$, i=1, ..., T compared to [3] is described in the following. Such sets represent the sets of bit sequences having $b_{T,k}=1$ and $b_{T,k}=0$, respectively, in eq. (63) of [3], reported here for convenience:

$$L(b_{T,k} \mid \tilde{y}^{(t)}) = \min_{\{\tilde{x}_{2T-1}, \tilde{x}_{2T}\} \in S(k)_T^-} T_{ED}^{(t)}[\hat{x}_{1,2T-2}(\tilde{x}_{2T-1}, \tilde{x}_{2T}), \tilde{x}_{2T-1}, \tilde{x}_{2T}] - \min_{\{\tilde{x}_{2T-1}, \tilde{x}_{2T}\} \in S(k)_T^+} T_{ED}^{(t)}[\hat{x}_{1,2T-2}(\tilde{x}_{2T-1}, \tilde{x}_{2T}), \tilde{x}_{2T-1}, \tilde{x}_{2T}] \quad (3)$$

where $M_c$-bit transmitted symbols belong to a complex constellation S with $2^{M_c}$ possible signal points; $\tilde{y}^{(t)}$ is the (real domain) processed received vector corresponding to the t-th layer permutation and $T_{ED}^{(t)}$ is the related Euclidean Distance (ED) metric (in the following the superscript index t will be dropped for brevity); $\hat{x}_{1,2T-2}(\tilde{x}_{2T-1},\tilde{x}_{2T})$ denotes the 2T-2 I and Q estimates of the T-1 non-reference layer symbols (eq. (60) of [2]) determined through spatial Decision Feedback Equalization (DFE) starting from a candidate value ($\tilde{x}_{2T-1}$, $\tilde{x}_{2T}$) of the I and Q couple of the reference layer symbol $X_T$; $b_{T,k}$ are the bits mapped onto $X_T$ having bit index k=1, ..., $M_c$; $S(k)_T^+$ and $S(k)_T^-$ represent the sets of symbols of the reference layer having $b_{T,k}=1$ and $b_{T,k}=0$, respectively.

The demodulation method [3] may require consideration of all the constellation symbols as candidate symbols for the reference layer and then minimizing the ED metrics over the sequences X wherein a given bit value is "1" (or "0"). This will be referred to as "full candidate search" (FCS) in the remainder of this document, as opposed to the LCS method described below.

The method is based on the following considerations:

if multiple constellation cases are to be handled by the detector, as may be required by commercial wireless applications, the complexity of near ML SO demapping is related to the largest constellation size under consideration (e.g. 64-QAM for 802.11n, but any other case can be considered without limiting the scope of the present invention).

This means that the complexity may be significantly reduced by restricting the search of the candidate QAM symbols to subsets of the entire QAM constellation, in case of the highest modulation order; lower modulation orders may still be demapped through the FCS principle of [3] without impacting significantly the complexity.

In packet-based OFDM transmissions, decoding latency constraints are satisfied at the level of the entire OFDM symbol, and not per carrier, such that the overall detection process per OFDM symbol is concluded in a fixed time, rather than assigning a given processing time to each OFDM sub-carrier. This means it is possible to select a few "worst-case" sub-carriers based on the fading conditions and still apply FCS to them, while the majority of data carriers will be demodulated through LCS.

In the remainder of the description, reference will be made to square-shaped subsets for example purposes, though it is intended that any other shape may be considered without impacting the generality of the disclosure.

Figure 7:
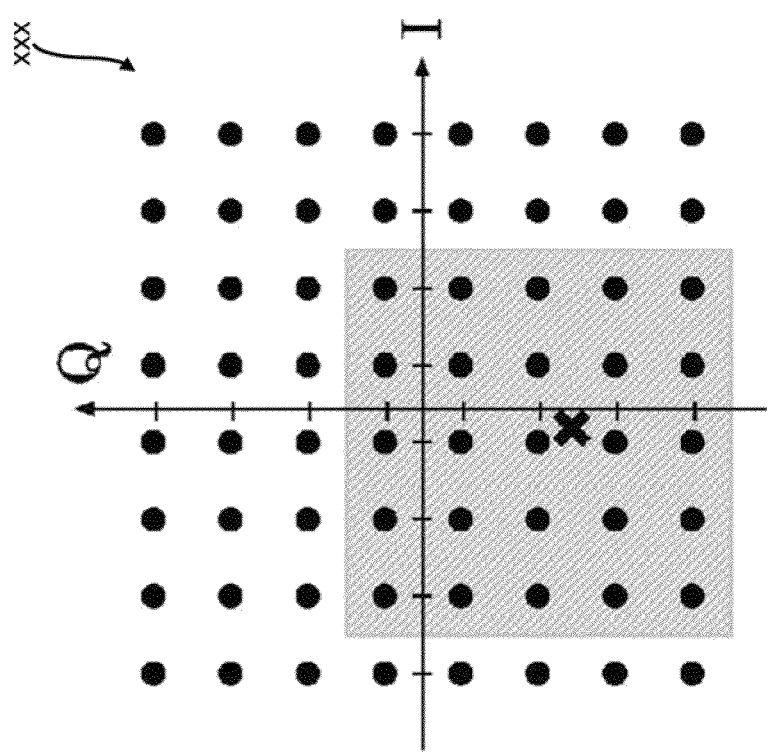
FIG. 7 illustrates a 64-QAM constellation where a $n^2$-sized square is placed around the received signal in accordance with an embodiment of this disclosure.

A principle of the LCS demodulation is to explore square subsets of the constellation. An example is illustrated in FIG. 7 for a single transmit and receive antenna, where the received signal is represented by the cross and the subset is a square properly (and approximately) centered.

The square subset is determined efficiently in order to reduce the probability that the true transmitted symbol falls outside the square. Simulation results show that performing "OFDM sub-carrier selection", i.e. dividing the sub-carriers in two groups based on the channel fading conditions, one to be demodulated through FCS and another one through LCS, may be a key to keeping a near optimal ML performance.

An embodiment is to start from the Zero Forcing (ZF) DFE estimate for the I and Q of the reference layer, which using the notation of [3], reads:

$$\bar{x}_{2T-1} = \text{round}\left(\frac{\tilde{y}_{2T-1}}{\tilde{R}_{2T-1,2T-1}^{(t)}}\right), \quad (4)$$

$$\bar{x}_{2T} = \text{round}\left(\frac{\tilde{y}_{2T-1}}{\tilde{R}_{2T-1,2T-1}^{(t)}}\right)$$

wherein $\tilde{R}_{i,j}^{(t)}$ the i,j entry of the triangular matrix $\tilde{R}^{(t)}$, t=1, ..., T (eq. (64) of [3]). Again the superscript index t will be dropped in the following unless otherwise stated. Then the set of PAM values to be considered can be determined by centering a set of values on the ZF estimate. Conceptually a technique based on the so-called Schnorr-Euchnerr (SE) enumeration method [4] can be used. The SE method means selecting the list of PAM elements in a "zig-zag" fashion around the initial estimate $\bar{x}_k$ as:

$$\tilde{x}_k \in \Omega_{x_k} \equiv \{\bar{x}_k, \bar{x}_k+1, \bar{x}_k-1, \bar{x}_k+2, \bar{x}_k-2, \ldots, \bar{x}_k-n_p\} \quad (5)$$

where k=(2T-1, 2T), n=$2n_p$+1 per PAM axis and $n^2$ is the size of the set of the complex symbols to search for the reference layer. For QAM symbols the square subset to explore then is obtained by using sets of the type (5) for both real axes (then it will be $S \equiv \Omega_{x_{2T-1}} \times \Omega_{x_{2T}}$). Such a list means ordering the PAM elements according to an increasing order ED from $\bar{x}_k$. In case of two transmit antennas, they are given by the couple of entries $(\tilde{y}_3, \tilde{y}_4)$ of the vector $\tilde{y}$ (eq. (41) in [3]), reported here for the reader's convenience:

$$\tilde{y} = \begin{bmatrix} \tilde{y}_1 \\ \tilde{y}_2 \\ \tilde{y}_3 \\ \tilde{y}_4 \end{bmatrix} = \begin{bmatrix} V_1/\sigma_1 \\ V_2/\sigma_1 \\ [V_3 - s'_{1,3}\tilde{y}_1 - s'_{2,3}\tilde{y}_2]/\beta_3 \\ [V_4 + s'_{2,3}\tilde{y}_1 - s'_{1,3}\tilde{y}_2]/\beta_3 \end{bmatrix} \quad (6)$$

It is noted that the order by which the elements are taken is not important as only the $n^2$ values themselves matter.

It may be further noted that in order to determine the final set, some additions to (5) are made, i.e.:

introduction of boundary control. To have reliable soft-output generation, in an embodiment it is important to always consider $n^2$ values despite the position of the initial ZF estimate with respect to the PAM constellation boundaries;

handling of even numbers n=$2n_p$ per PAM axis.

If all the OFDM sub-carriers are demodulated employing a same number of clock cycles $N_{cycles}$, then the time $T_c$ employed to demodulate one OFDM symbol is given by:

$$T_c = N_{cycles} \cdot N_{DC}/f_{clk} \leq L_c \quad (7)$$

where $f_{clk}$ is the clock frequency, $N_{DC}$ is the number of data carriers per OFDM symbol and $L_c$ is the available decoding time per OFDM symbol (design constraint).

A key point of an embodiment of the LCS method is to let the detector employ a variable number of clock cycles to demodulate different OFDM tones, still satisfying (7) on average for the $N_{DC}$ data carriers in an OFDM symbol. Said in other words, the constraint to be respected is that the maximum total number of clock cycles employed to demodulate the entire OFDM symbol is $N_{tot}=N_{c,avg} \cdot N_{DC}$, where $N_{c,avg}$ is the (maximum) average number of clock cycles available per each OFDM tone. The corresponding OFDM symbol demodulation time is:

$$T_c = N_{tot}/f_{clk} = N_{c,avg} \cdot N_{DC}/f_{clk} \qquad (8)$$

In practical implementations, the sub-carrier selection criterion may be adapted to the constraints of the related HW architecture. In particular, it may be desirable to employ regular architectures to perform the demodulation in order to guarantee fixed data rate and low processing latency. As better detailed in the remainder of this document, an associated embodiment uses several so-called "ED units", the function of each one being to compute an ED term (like (24) or (35) in [3] for T=2 transmit antennas) at each clock cycle, re-written here for convenience:

$$T_{ED}(x) = \|\tilde{y} - \tilde{R}x\|^2, t=1,\ldots,T \qquad (9)$$

Then, a good trade-off between HW complexity and performance degradation may be obtained as follows:
divide the OFDM sub-carriers into two groups: $N_L$ sub-carriers that are demodulated by LCS and searching $n^2 < M^2$ (=64) QAM symbols (per antenna); $N_H$ sub-carriers that are demodulated by FCS [2].
Select the size n of the number of PAM elements to consider around the ZF I and Q values. A reasonable assumption is that a corresponding regular HW architecture will evaluate n parallel EDs (per antenna) at each clock cycle, as per an embodiment outlined later in the document. Then it will take $N_{cycles} = N_{c,L} = n$ clock cycles to span all the sub-set of FIG. 7 and demodulate the best-case sub-carriers. If $N_{c,H}$ is the number of clock cycles required by the worst-case sub-carriers, then the condition to be satisfied in terms of number of clock cycles per OFDM symbol ($N_T$) is:

$$N_T = \qquad (10)$$
$$N_L N_{c,L} + N_H N_{c,H} = (N_{DC} - N_H)n + N_H N_{c,H} = N_{tot} = N_{c,avg} \cdot N_{DC}$$

Finally, from (10), the number $N_H$ of worst-case sub-carriers to be selected is given by:

$$N_H = \left\lfloor N_{DC} \frac{N_{c,avg} - n}{N_{c,H} - n} \right\rfloor \qquad (11)$$

A sub-carrier selection criterion is described below. The noise variance associated with the estimates, for a given channel realization, is given by $N_0/\tilde{R}_{2T,2T}^{(t)}$, t=1, ..., T. Then the ZF estimates (4) of the sub-carriers that experience the higher fading are subject to the higher noise variance. For this reason the size of two groups, $N_L$ and $N_H$, and the related sub-carrier indexes, may be determined by:

i. Derive $N_H$ (and thus $N_L$) from the design timing constraints and eq. (11).
ii. For a given sub-carrier h, and for each h=1, ..., $N_{DC}$, assign to the fading coefficient r(h) the worst case value over the set of transmit antenna indexes, i.e.

$$r(h) = \min_{t=1,\ldots T} \{\tilde{R}_{2T,2T}^{(t)}(h)\} \qquad (12)$$

iii. Keep a list of the $N_H$ carrier indexes corresponding to the $N_H$ lowest values of r(h).

It is noted that the sub-carrier selection steps may be performed during the channel estimate processing stage; this implies that for static channel environments like those typical e.g. of indoor WLANs, they may be performed once per packet and used to demodulate all the OFDM symbols composing the packet.

It is also noted that in case Gray-mapping is utilized, as typically foreseen by most wireless commercial standards, it may be better to have n≥5 in order to compute reliable LLRs because, in this case, at least a symbol with a certain bit equal to "1" and another one with the same bit equal to "0" will belong to the searched QAM subset. This is not true in general when n=4 and in this case some of the ED metrics may remain initialized to constant initialization values.

Moreover, as clear from (11), an upper bound to n comes from the condition $n < N_{c,avg}$. The meaning is that some time may be saved when demodulating the best carriers, to be used when demodulating the worst ones which may actually require $N_{c,H} > N_{c,avg}$ clock cycles in practical cases. The actual number $N_{c,H}$ depends on the selected VLSI solution (i.e. on the chosen degree of parallelism) and several cases satisfying (11) are possible; the choice depends on the desired trade-off between HW complexity and performance. Example values for [1], 64-QAM, are shown in Table 1 (related to $f_{clk}$=80 MHz and $L_c$=4 μs).

It is noted that LLRs may not be optimal (in max-log sense) for reduced size QAM sub-sets $S = n^2 < M^2$. In this case it may be desirable to improve the performance to consider an enlarged set of sequences X for the computation of (3). A way to do so will be referred to as "cross demapping" (CD) in the remainder of this document. CD means considering also the other sets $S_j$ with j≠t when computing bit LLRs relative to $X_t$. Mathematically this means that for antenna T and a given QAM symbol candidate for the reference layer $X_t = \bar{X}$, the ED metrics (9) are minimized over the enlarged set $S'_t(\bar{X})$:

$$S'_t(\bar{X}) = \left\{ \underset{X \in S_t(\bar{X}) \text{ OR } X \in S_{j \neq t}: X_t = \bar{X}}{\operatorname{argmin}} T_{ED,t}(X), \forall \bar{X} \in S \right\} \qquad (13)$$

where $S_t(\bar{X})$ denotes the sequences obtained by grouping a value $X_t = \bar{X}$ for the reference layer and the symbol estimates obtained for the other layers e.g. through spatial DFE.

HW Architecture Design and Implementation

Figure 8:
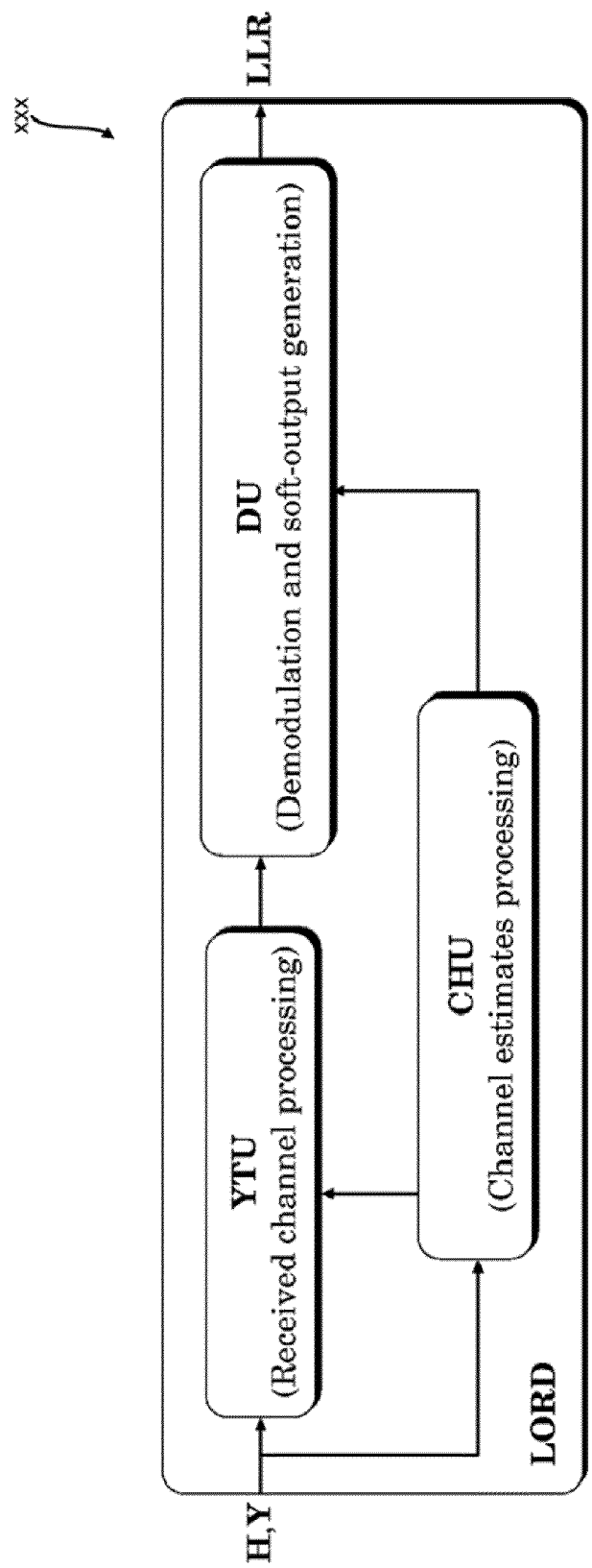
FIG. 8 illustrates a MIMO detector architecture in accordance with an embodiment of this disclosure.

The HW architecture of an embodiment of a near-ML MIMO detector [2] is shown in FIG. 8, where the following units are shown:
i. a channel estimates processing unit (CHU), wherein the CHU calculates T linear transformations of the type $R_j = A_j H_j$, j=1, ... T of as many column-wise re-ordered versions ($H_j$) of the channel estimate matrix H, where $A_j$ is a matrix converting $H_j$ in an upper triangular matrix $R_j$, the ordering of the columns of $H_j$ corresponds to an ordering of the transmit symbols in the sequence $X_j$, and where each ordering differs from the other for the last index value (i.e. that of the "reference layer"), so that all T layers become in turn the reference layer in one sequence $X_j$ once and only once;

ii. a received vector processing unit (YTU), which computes T processed received vectors $Y_j'=A_jY$, $j=1, \ldots, T$.

iii. a unit that performs demodulation and bit soft-output generation (DU).

In one particular embodiment of the CHU, $Q_j=A_j$ is an orthonormal matrix, $R_j$ is an upper triangular matrix and $H_j=Q_jR_j$, i.e. the linear transformations are "QR" decomposition, QRDs, of $H_j$ and in one particular embodiment the YTU calculates the matrix-vector product between the $Q^T$ matrix (i.e. the transpose of the orthonormal Q matrix result of the QRD) and the received vector Y.

It is intended that an embodiment of the present invention may be used in either OFDM-based or single carrier receivers unless otherwise stated. If OFDM receivers are dealt with, the number of OFDM sub-carriers processed in parallel represents a further degree of parallelism and such number may actually be varied in practical implementations with no loss of generality.

Stated that, the description in the remainder of this document is intended to be valid for OFDM receivers wherein one or more sub-carriers at a time is/are processed, with no loss of generality.

1. Channel Estimates Processing

An efficient CHU may implement a MQRD HW architecture based on the iterative decomposition principle, meaning that a generic function is decomposed into a sequence of sub-functions executed multiple times in order to reuse the same HW resources as much as possible. This idea may be applied to eq. (71)-(73) in [3], related to the computation of the T matrices $\tilde{R}^{(t)}$, $t=1, \ldots, T$: the core operations may be grouped in dedicated units and be executed iteratively several times.

1.1 Two Transmit Antenna Case

The case of T=2 transmit and R≥2 receive antennas (in short, 2×R) is a configuration of interest for many commercial applications and as such it deserves particular attention. Several simplifications in the processing architecture are possible with specific reference to this case and will be described below.

Figure 9:
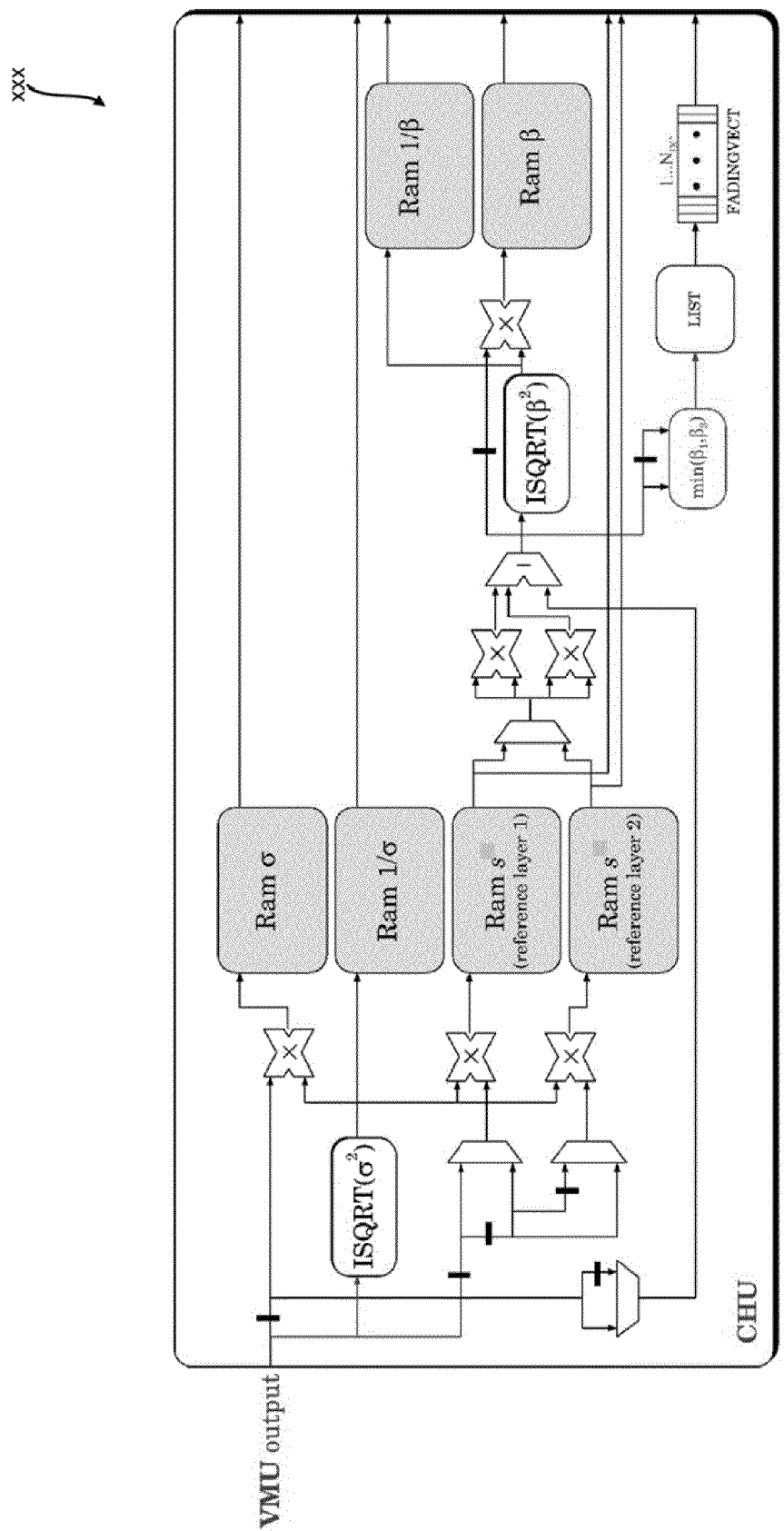
FIG. 9 illustrates the channel estimates processing architecture (CHU) for a 2×R MIMO receiver in accordance with an embodiment of this disclosure.

A possible architecture is shown in FIG. 9. It calculates:

$$\tilde{R}^{(1)} = \begin{bmatrix} \sigma_3 & 0 & s_{1,3}/\sigma_3 & -s_{1,4}/\sigma_3 \\ 0 & \sigma_3 & s_{1,4}/\sigma_3 & s_{1,3}/\sigma_3 \\ 0 & 0 & \beta_1 & 0 \\ 0 & 0 & 0 & \beta_1 \end{bmatrix} \quad (14)$$

$$\tilde{R}^{(2)} = \begin{bmatrix} \sigma_1 & 0 & s_{1,3}/\sigma_1 & s_{1,4}/\sigma_1 \\ 0 & \sigma_1 & -s_{1,4}/\sigma_1 & s_{1,3}/\sigma_1 \\ 0 & 0 & \beta_3 & 0 \\ 0 & 0 & 0 & \beta_3 \end{bmatrix}$$

as well as $1/\sigma_1, 1/\sigma_3$ and $1/\beta_1, 1/\beta_3$. The notation is the same as [3], namely: $\sigma_{2k-1}^2 \equiv \|h_{2k-1}\|^2$, $s_{j,k} \equiv h^T_j h_k$ and $\beta_{2k-1}^2 \equiv \|q'_{2k-1}\|^2 = \|q'_{2k}\|^2$, where $q'_j$ is the j-th column of the orthonormal matrix Q before normalization.

All such terms are stored in dedicated RAM blocks. The units ISQRT(A) in figure compute the inverse square root of the input argument A.

Figure 10:
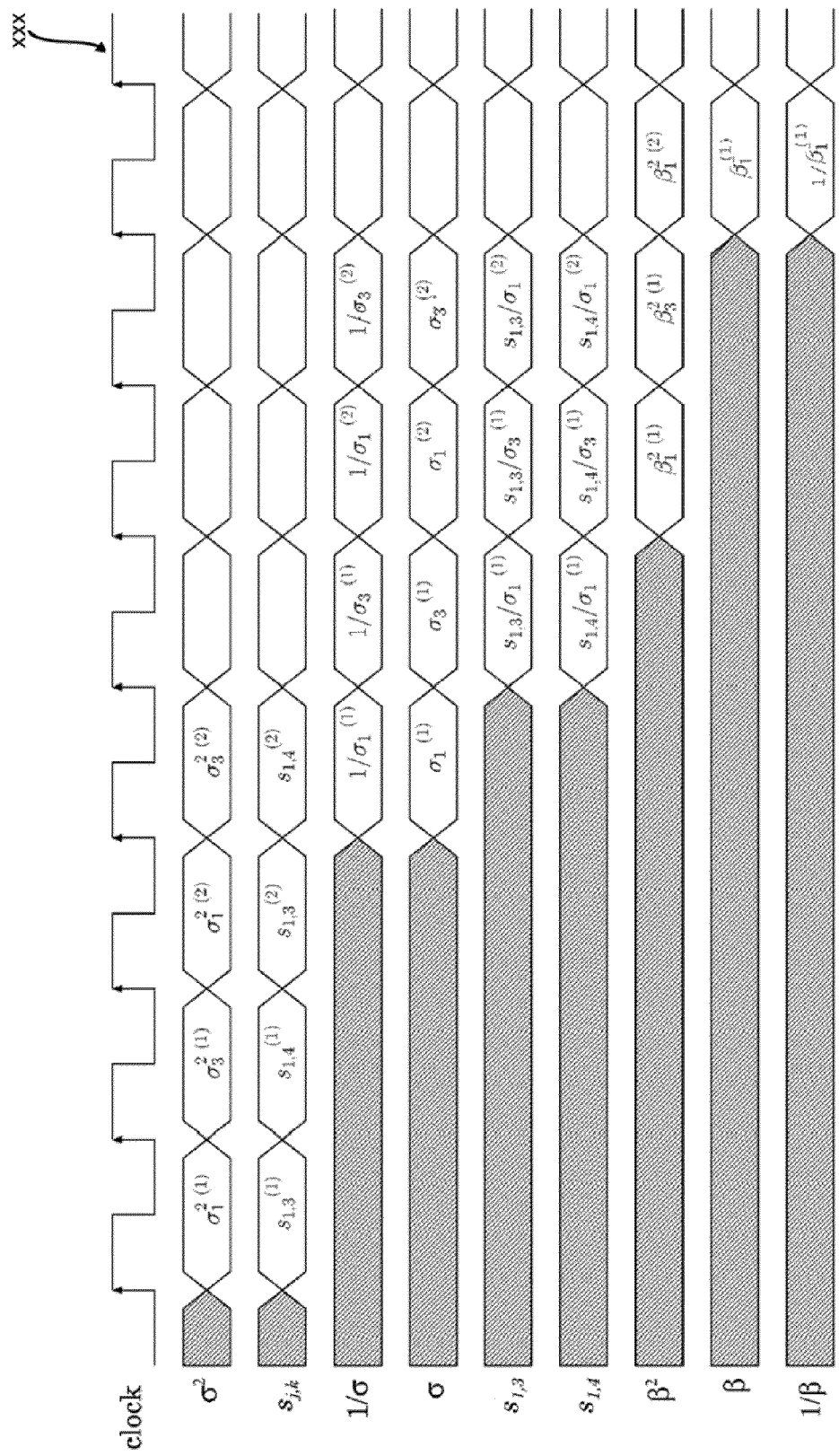
FIG. 10 illustrates an example of a timing diagram of the CHU for a 2×R MIMO receiver in accordance with an embodiment of this disclosure.

FIG. 10 shows timing diagram associated with an embodiment of the architecture of FIG. 9. The superscript of the signals in the figure refers to the sub-carrier index: the signals corresponding to the first two sub-carriers are shown. Each sub-carrier is processed in two clock cycles: $\sigma_1^2, s_{1,3}$ in parallel at the first clock cycle, and $\sigma_3^2, s_{1,4}$ at the second. Because of this scheduling, one ISQRT unit may be used to compute both $\sigma_1$ and $\sigma_3$.

Overall, the shown schedule may be suitable for a fully pipelined structure: successive sub-carriers may be input once every two clock cycles, for a resulting input data rate ($r_{MQRD}$) of ½. It is noted that the entries of the matrices $\tilde{R}^{(1)}, \tilde{R}^{(2)}$ may be stored as a single word in a same single-port RAM cut, thus reducing memory logic compared to that required by two separate RAM blocks. The overall channel processing time ($T_{MQRD}$) for calculating two QRDs for $N_{DC}$ data sub-carriers is then:

$$T_{MQRD}=(1/r_{MQRD}) \cdot N_{DC}/f_{clk} \quad (15)$$

Recalling that $N_{DC}$ is the number of data carriers per OFDM symbol and $f_{clk}$ is the clock frequency.

As another remark on FIG. 9, the unit LIST is related to the optional LCS demodulation and bit soft-output generation method. It is dedicated to the sub-carrier list management as in this case a list of $N_H$ worst OFDM sub-carriers based on the channel fading conditions are to be determined (cfr. (11)).

In an embodiment, the unit keeps track of a sorted list of the $N_H$ (out of $N_{DC}$) lowest values of the minimum $\tilde{R}_{2T,2T}^{(t)}(h)$ values between the two processing units corresponding to the two transmit antennas; besides, the corresponding carrier indexes are also stored. It might be convenient to keep track of each sub-carrier status through an $N_{DC}$ 1 bit logic array (FADINGVECT in FIG. 9) where a value of "0" or "1" may stand for sub-carrier to be demodulated using LCS or FCS. It is noted that the maximum data input rate ($r_{MQRD}$) of the unit may be unaffected by the sub-carrier selection architecture.

1.2 T Transmit Antenna Case

In the following, an embodiment of the above reported processing architecture description is generalized to the case of T transmit antennas. Multiple (T) QRDs of the channel estimate matrix are computed, per each OFDM sub-carrier.

An efficient implementation of the MQRDs is the GSO [2]. Using this method, during the QR decomposition, the matrix $\tilde{R}^{(t)}$ is computed row-wise from top to bottom and the matrix Q column-wise from left to right. Then, by properly choosing the layer sequence prior to performing the GSO, some terms are shareable among the T QRDs and do not need to be re-computed (see above). In particular, the optimal resulting complexity corresponds to two complete QRDs plus extra terms.

Figure 11:
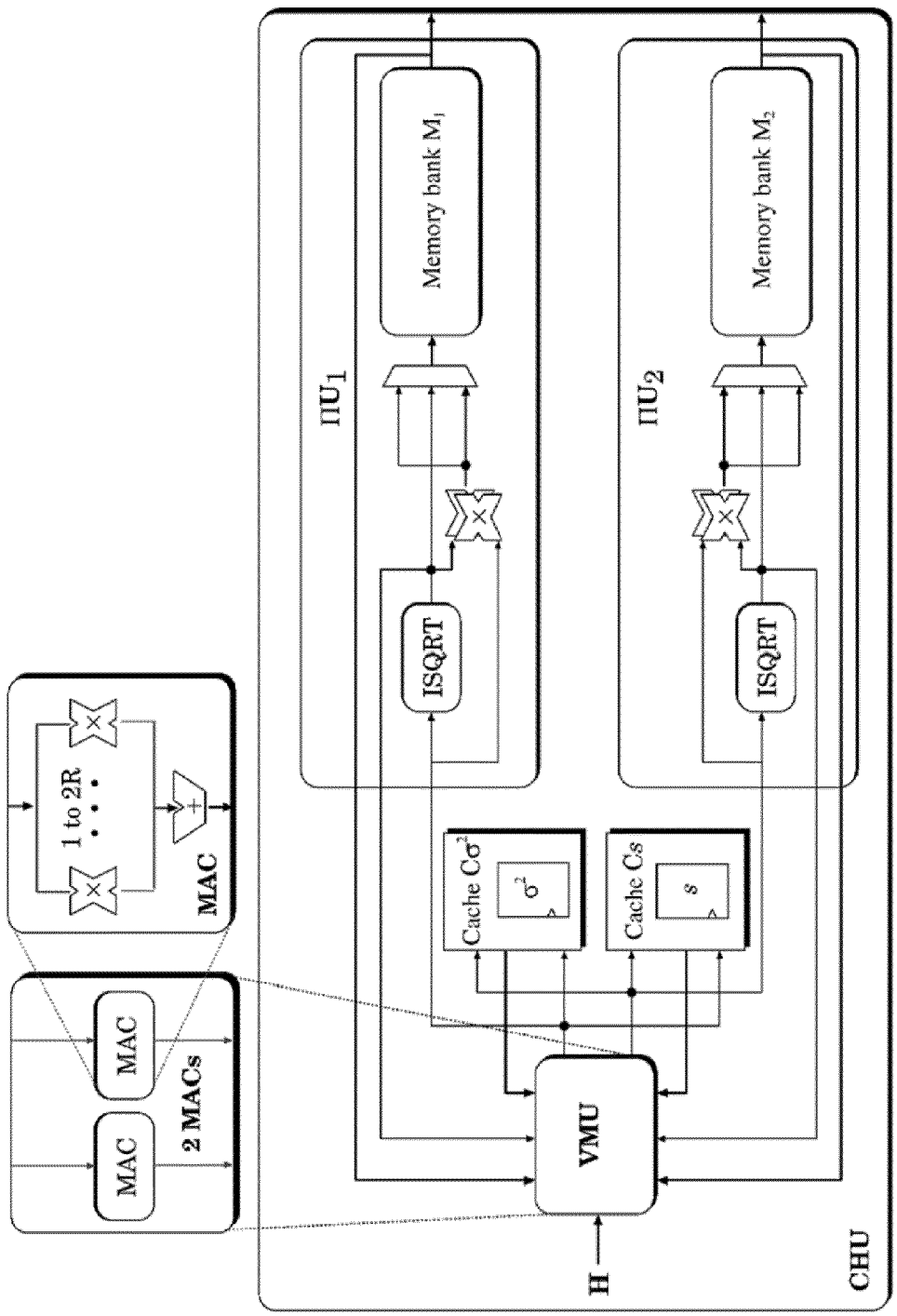
FIG. 11 illustrates an example of the CHU for a 4×R MIMO receiver in accordance with an embodiment of this disclosure.

An embodiment of the corresponding architecture of the CHU is shown in FIG. 11 and is characterized by a basic level of parallelism equal to two, corresponding to the number of full QRDs to be computed. Accordingly, the core unit of said CHU is a vector multiplier unit (VMU) which includes two parallel working Multiplier and Accumulator (MAC) units. It is understood that different level of parallelism may characterize alternative embodiments.

The MAC units compute 2R multiplications, required by the entries $\tilde{R}_{i,j}^{(t)}$, scalar product between 2R-element vectors. It is noted that in the whole design, the VMU is the only unit which depends on the number of receive antennas R. Therefore the design of the CHU is to be considered parameterizable with respect to the number of receive antennas.

In an embodiment the number of multipliers of each MAC equals 2R, so that each entry $\tilde{R}_{i,j}^{(t)}$ is computed in a single clock cycle. In alternative embodiments, the MAC includes a number of multipliers K sub-multiple of 2R. This implies that the computation of the $\tilde{R}_{i,j}^{(t)}$ terms is performed using 2R/K clock cycles but it may bring two important advantages, both desirable for VLSI implementation:

complexity saving and maximum hardware reuse;
a relaxed latency constraint of the ISQRT unit and the VMU, connected through a feedback path (result of the QRD recursive nature).

Figure 12:
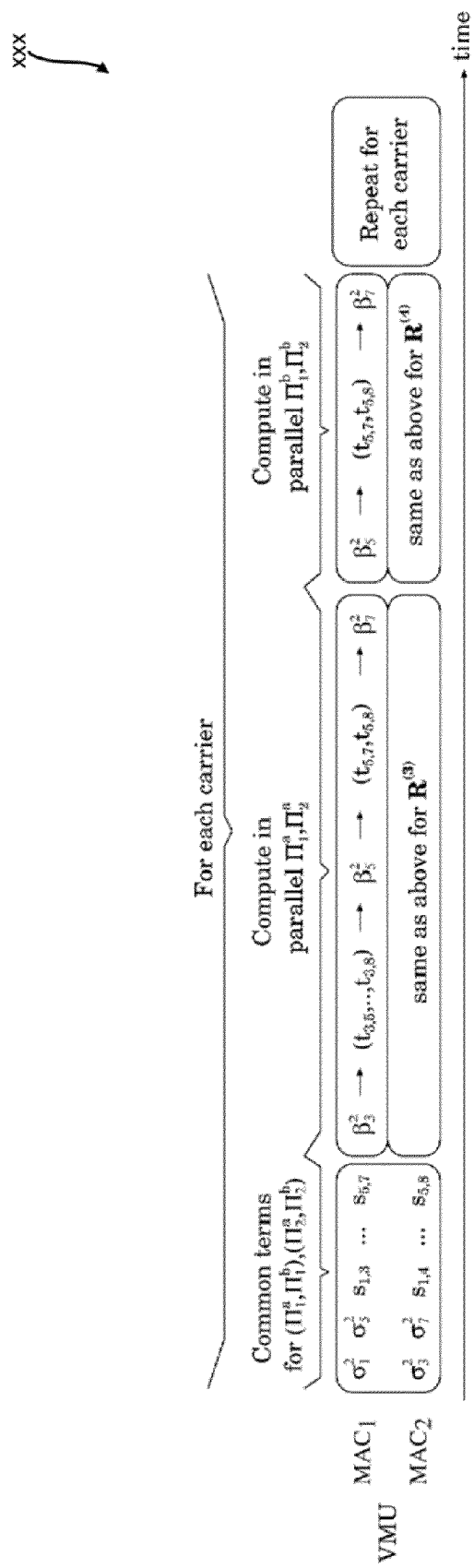
FIG. 12 illustrates an example of a timing diagram of the CHU for a 4×R MIMO receiver in accordance with an embodiment of this disclosure.

As an example, FIG. 12 shows the timing diagram for the 4×R reference case, where $t_{j,k}=q_j^T h_k$, where $q_j$ is the j-th column of the orthonormal matrix Q. Moreover, the two full QRDs labeled $\Pi_1^a$ and $\Pi_2^b$ correspond to the layer ordering sequence 1,2,3,4 and 3,4,1,2, respectively; the QRD originated starting from $\Pi_1^a$ is labeled $\Pi_1^b$ and is associated with the layer permutation 1,2,4,3; similarly, the one derived from $\Pi_2^a$ is labeled $\Pi_2^b$ and corresponds to the layer sequence 3,4,2,1.

An embodiment of the operations performed by the CHU shown in FIG. 11 will be detailed in the following with reference to the 4×R case. First the terms shareable among all the $\tilde{R}^{(t)}$ matrices, i.e. the scalar products among the channel columns, $\sigma_{2k-1}^2$ and $s_{j,k}$, are computed; then the terms specific of each transmit sequence ordering follow. The terms $\sigma_{2k-1}^2$ and $s_{j,k}$ are stored in their dedicated cache memories ($C\sigma^2$ and Cs respectively) and used by the two units $\Pi U_1$ and $\Pi U_2$ (associated respectively to the layer sequences $\Pi_1^a$, $\Pi_1^b$ and $\Pi_2^a$, $\Pi_2^b$). A cache memory, i.e. a bank of dedicated registers, may be used instead of a Random Access Memory (RAM) as it occupies low chip area and favors multiple simultaneous read. On the other hand, the computed $\tilde{R}_{i,j}^{(t)}$ terms may be stored in two RAM blocks, M1 and M2, operated independently by the respective units $\Pi U_1$ and $\Pi U_2$. They are subject to read/write operations as the row-wise recursive computation of the entries $\tilde{R}_{i,j}^{(t)}$, i,j>2 requires the processing of the already computed terms. The recursive computations translate into the feedback paths involving: two dedicated multipliers to perform the normalization of $s_{j,k}$, the VMU, and the ISQRT units.

To summarize, an embodiment of the above-described CHU architecture has a basic parallelism degree of two, matched to the number of required full QRDs to be computed, and is flexible with the number of transmit antennas T: the size of the memory banks in FIG. 11, equal to the depth of the $\tilde{R}^{(t)}$ matrices, scales with T; assigning a single MAC to the calculation of the $\tilde{R}_{i,j}^{(t)}$ terms of each sequence order makes the architecture independent from the $\tilde{R}^{(t)}$ matrix size. Besides, the whole CHU architecture is scalable with T (and R) in terms of processing complexity. This derives from the chosen GSO formulation, which is suitable for a modular HW architecture approach i.e. the associated CHU architecture is characterized by a scalable complexity to larger T×R MIMO dimensions starting from the basic 2×2 modules.

With the embodiments of the method and apparatus disclosed so far, MQRDs are efficiently computed through low-complexity and time-shared based HW architectures.

It is understood that alternative embodiments of the above reported low-complexity formulation of the MQRDs are possible characterized by a level of parallelism K, where K is a sub-multiple of T, corresponding to K units $\Pi U_j$, j=1, . . . k that replace the two main units of FIG. 11.

In some cases other alternative embodiments for the CHU might be preferable. For example, it might be necessary to use architectures that compute the T QRDs with limited or absent processing sharing between them, suitable for an enhanced level of parallelism but at the expense of a resulting complexity corresponding to that of T times a single QRD. This might be the best embodiment if SDM+STBC schemes of the type shown in FIG. 4 are considered, as the performance optimization of those systems may require layer permutations alternative to those previously denoted as $\Pi_1^a, \Pi_1^b$ and $\Pi_2^a, \Pi_2^b$ (which may be optimal for an efficient GSO-based MQRD computation).

From the above considerations, some properties of the CHU architecture entailed by an embodiment of the present invention are:

1. It is parameterizable, in terms of both the number of transmit and receive antennas.
2. It is parallelizable with respect to the number of transmit antennas.
3. It is scalable to larger MIMO dimensions starting from a basic 2×2 one.

Furthermore, alternative embodiments may be possible which may be derived from this disclosure.

2. Received Signal Processing

An embodiment of the received vector processing unit (YTU) shown in FIG. 8 implements the T processed received vectors $Y_j'=A_j Y$, j=1, . . . T as:

$$Y_j' = Q_j^T Y \quad (16)$$

where $Q_j^T$ denotes the transpose conjugate of the orthonormal matrix $Q_j$.

Moreover, an architecture of (16) implements in HW (75) of [2], generalization of (6):

$$\tilde{y}^{(t)} = \begin{bmatrix} \tilde{y}_1 \\ \tilde{y}_2 \\ \vdots \\ \vdots \\ \vdots \\ \tilde{y}_{2k} \end{bmatrix} = \begin{bmatrix} V_1/\sigma_1 \\ V_2/\sigma_1 \\ (V_3 - s'_{1,3}\tilde{y}_1 - s'_{2,3}\tilde{y}_2)/\beta_3 \\ (V_4 + s'_{2,3}\tilde{y}_1 - s'_{1,3}\tilde{y}_2)/\beta_3 \\ (V_5 - s'_{1,5}\tilde{y}_1 - s'_{2,5}\tilde{y}_2 - t'_{3,5}\tilde{y}_3 - t'_{4,5}\tilde{y}_4)/\beta_5 \\ \vdots \\ \left[ V_{2k-1} - s'_{1,2k-1}\tilde{y}_1 - s'_{2,2k-1}\tilde{y}_2 - \sum_{i=2}^{k-1}(t'_{2i-1,2k-1}\tilde{y}_{2i-1} + t'_{2i,2k-1}\tilde{y}_{2i}) \right]/\beta_{2k-1} \\ \left[ V_{2k} + s'_{2,2k-1}\tilde{y}_1 - s'_{1,2k-1}\tilde{y}_1 - s'_{1,2k-1}\tilde{y}_2 - \sum_{i=2}^{k-1}(-t'_{2i,2k-1}\tilde{y}_{2i-1} + t'_{2i-1,2k-1}\tilde{y}_{2i}) \right]/\beta_{2k-1} \end{bmatrix} \quad (17)$$

for t=1, . . . , T. A possible advantage of (17) is that T vectors $\tilde{y}^{(t)}$ may be computed sharing the scalar products $V_k = h_k^T y$ (see above) and $s_{jk}$, $t_{jk}$.

It is noted that embodiments are possible wherein all 2R-element scalar products (those involved in the YTU and those involved in the CHU) are carried out by a single VMU time-shared between the CHU and the YTU.

3. Demodulation and Soft-Output Generation

As previously discussed, the DU performs demodulation and bit soft-output generation. The steps performed by the DU, to be repeated for every reference layer, are:

Compute a set of ED metrics;
Find the minimum ED of the partitioned constellation (where the constellation partition depends upon the modulation order and the evaluated bit) and compute the LLRs for every bit.

Figure 13:
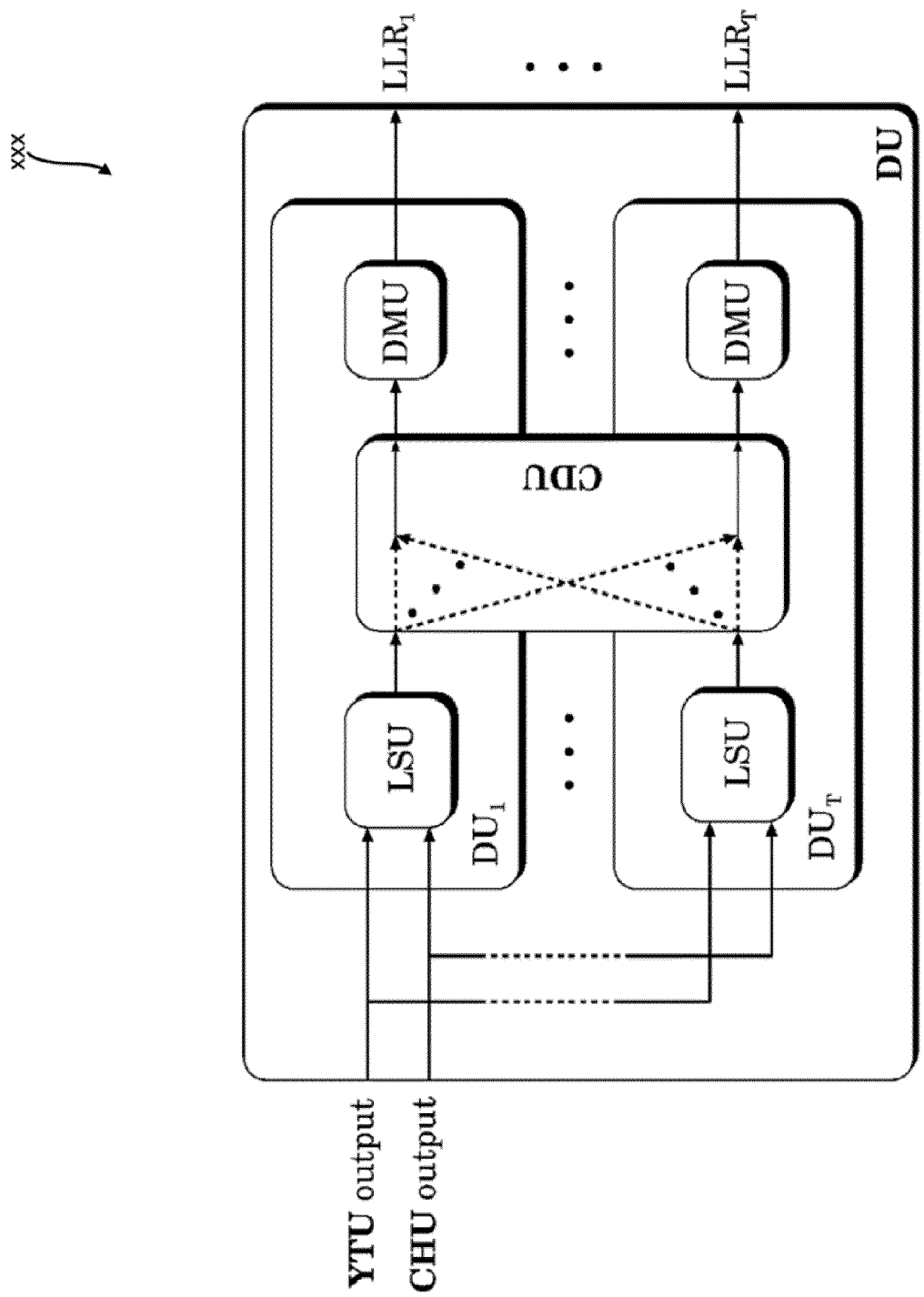
FIG. 13 illustrates a demodulation and soft-output generation architecture (DU) in accordance with an embodiment of this disclosure.

FIG. 13 illustrates an example architecture of the DU: it includes a lattice search unit (LSU), an optional cross-demapping unit (CDU) and a bit demapping unit (DMU).

The role of the LSU is to perform the "constellation sweeping" i.e. a procedure consisting of:

i. selecting a set of candidate complex symbols of the reference layer belonging to an input (QAM/PSK) constellation;
ii. computing the remaining symbol estimates through the spatial DFE operation;
iii. for each determined sequence of transmit symbol estimates, computing the ED metrics.

Figure 14:
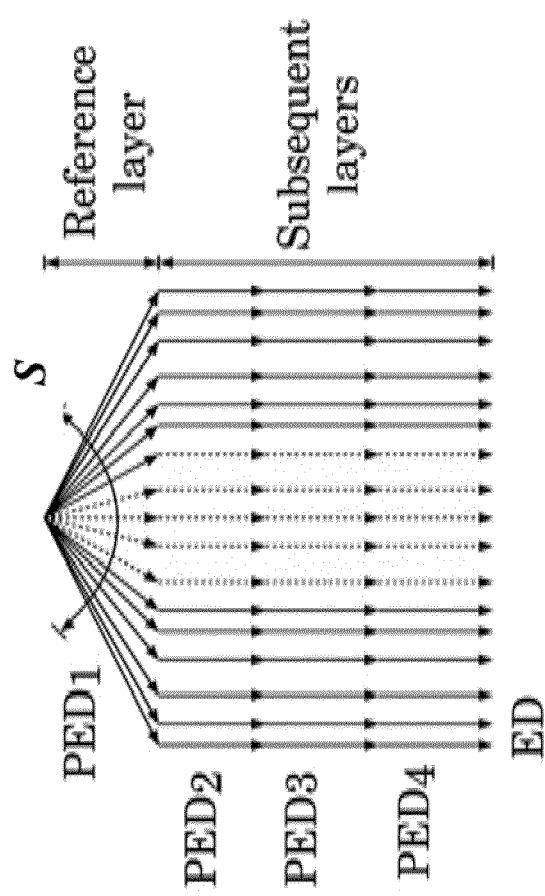
FIG. 14 illustrates a LORD detection tree traversing principle in accordance with an embodiment of this disclosure.

FIG. 14 graphically represents an example computation of the ED for a 4×R transmission scheme and generic constellation of size S as a tree traversal.

In an embodiment targeting high data rate and low latency applications, T parallel LSUs, one for each reference layer, are instantiated within the DU.

In an alternative embodiment, the DU includes one LSU which sequentially computes the EDs associated with the T sets of candidate symbols of the respective reference layers: the throughput decreases by a factor of T, but the area saving is of the same order of magnitude.

It is understood that also any embodiment of the DU featuring N instantiated LSUs, with N<T and computing the EDs through some iterative loops, is to be considered part of the present disclosure.

Figure 15:
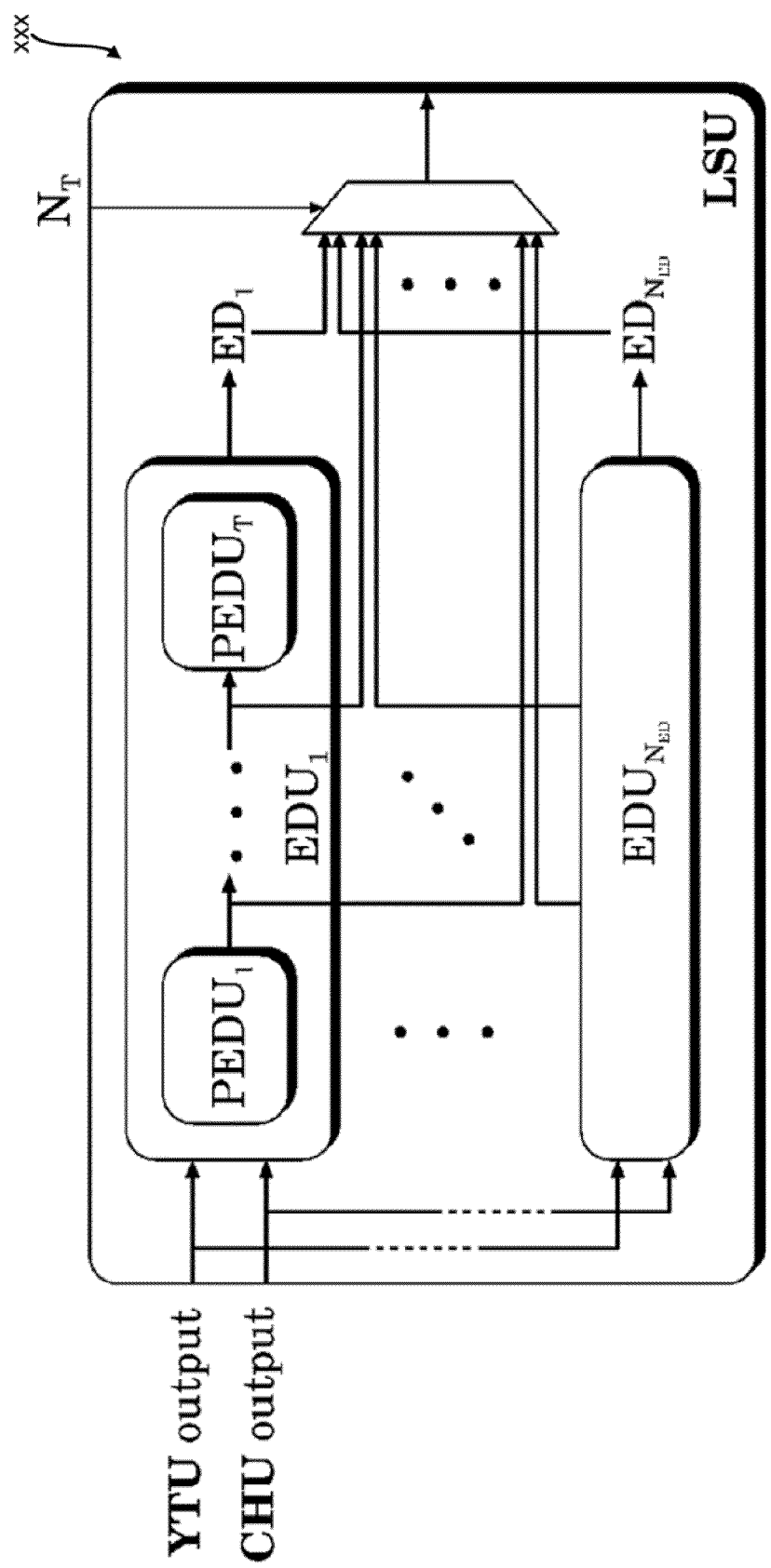
FIG. 15 illustrates a lattice search unit (LSU) architecture in accordance with an embodiment of this disclosure.

FIG. 15 shows the architecture of a LSU. It is scalable with the number ($N_{ED}$) of ED units (EDUs), wherein each EDU computes a single ED. Each ED is the result of the summation of T partial Euclidean distances (PEDs). A PED is defined in an embodiment as the summation of the two independent squares related to the I and Q of a given complex symbol (i.e. a single term of eq. (57) of [3]).

An example architecture for the EDU is illustrated in FIG. 15, where a PED unit (PEDU) at every clock cycle computes a PED term which is passed on in a forward-pipeline manner to the subsequent PEDU. In an embodiment each EDU includes T PEDUs.

It is understood that alternative EDU embodiments are possible including K PEDUs, where K is an integer sub-multiple of T. An ED metric is then output in T/K iterative loops and as many clock cycles.

It is also noticed that the LSU of FIG. 15 is parameterizable in terms of T: an architecture sized for a T×R MIMO configuration may handle T'×R schemes as well, where T'<T. In this case, the output of the LSU is given by the multiplexer of FIG. 15, driven by the number of active antennas $N_T$.

An embodiment of an LSU architecture implements a constellation sweeping method based on [2], where $M^2$ EDs are to be computed to demodulate $M^2$-QAM constellation symbols. $N_{ED}$ parallel EDUs per antenna are instantiated, each one computing an ED metric in one clock cycle. By further assuming that a basic level of parallelism of T characterizes the LSU design, and that a fixed number of clock cycles ($N_{cycles}$) is employed to demodulate each sub-carrier, the number $N_{ED}$ may be set based on the timing equation for the largest size constellation to be supported:

$$N_{cycles} = L_c \cdot f_{clk}/N_{DC} \tag{18}$$

wherein $L_c$ is the available decoding time per OFDM symbol and $f_{clk}$ is the design clock frequency. Finally, from $N_{cycles}$ one has $$N_{ED} = \lfloor N_{cycles}/M^2 \rfloor \tag{19}$$

Figure 17:
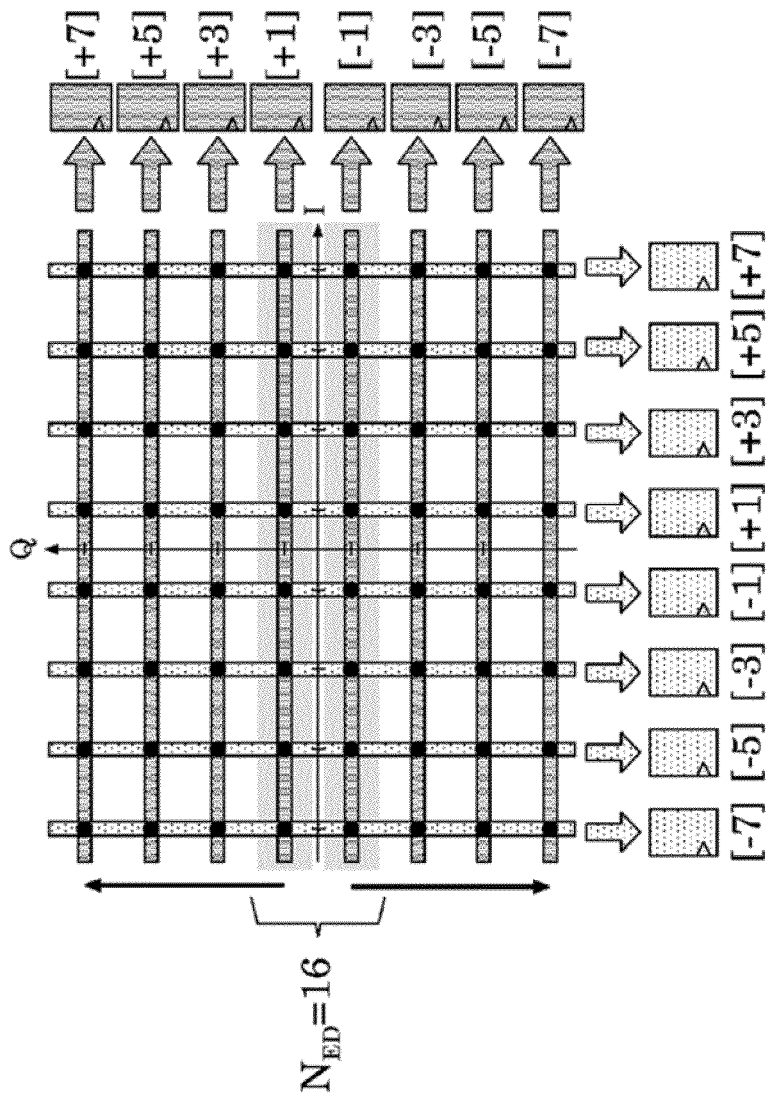
FIG. 17 illustrates a symbol demapping method in accordance with an embodiment of this disclosure.

For a regular and simple data flow, in an embodiment, $N_{ED}$ is an integer sub-multiple of $M^2$. As an example, the corresponding constellation sweeping procedure is shown in FIG. 17 for $M^2=64$, $f_{clk}=80$ MHz and $L_c=4$ μs. From (18)-(19) $N_{ED}=16$. The proposed flow is to divide them in two subsets of $N_{ED}/2$ units (the gray rectangles in figure), spanning the positive and negative Q semi-axes as indicated by the arrows. At each clock cycle, $N_{ED}/2$ ED metrics are computed for a same positive Q value and all I PAM values; similarly, at the same clock cycle, $N_{ED}/2$ ED metrics are computed for a negative Q value.

It is noted an embodiment of the described LSU architecture generates soft-output with a deterministic data rate and latency and this may represent a significant advantage compared to the state of the art of near-ML detection VLSI implementations.

It is also noted that $N_{ED}$ may be determined based on the largest modulation order to be supported; flexibility is still present as lower order modulations may be handled simply by disabling the unused ($N_{ED}-M$) EDUs (thus saving power).

Spatial DFE is an operation performed by the LSU in correspondence with every candidate symbol of the reference layer(s). It consists of performing a quantization (or "slicing") operation to the closest PAM value in order to determine symbol estimates for the non-reference layers (see also [3], eq. (26)):

$$\hat{x}_j = \text{round}\left(\frac{\tilde{y}_j - \sum_{k>j} \tilde{R}_{j,k}\hat{x}_k}{\tilde{R}_{j,j}}\right) \tag{20}$$

In principle, a multiplication of the numerator in (20) by $1/\tilde{R}_{j,j}$ may be needed. However, an efficient embodiment avoids such multiplication by determining the PAM value $\hat{x}_j$ such that $\tilde{R}_{j,j}\hat{x}_j$ is the closest to $$\tilde{y}_j - \sum_{k>j} \tilde{R}_{j,k}\hat{x}_k.$$

Figure 16:
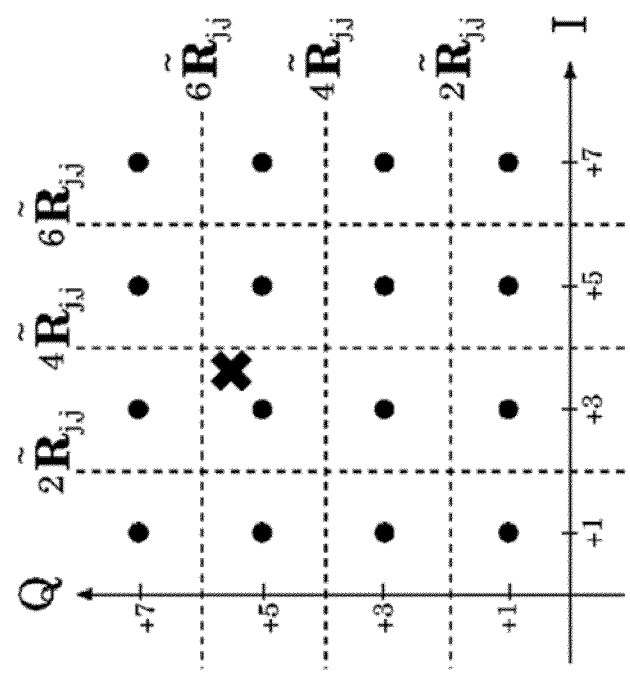
FIG. 16 illustrates a simplified slicing operation in accordance with an embodiment of this disclosure.

As shown for the 64-QAM modulation order in FIG. 16, $\tilde{R}_{j,j}\hat{x}_j$ does not require a true multiplication as $\hat{x}_j$ may be found by comparing $$\tilde{y}_j - \sum_{k>j} \tilde{R}_{j,k}\hat{x}_k$$

with the threshold values $p \cdot \sigma_{2k-1}^{(t)}$, $p=2, 4, 6$, calculated through simple shift-add operations.

LLRs generation (3), performed by the DMU, is computed from the minimum of the ED metrics over $S(k)_j^+, S(k)_j^-$, the sets of symbols of the reference layer having bits $b_{j,k}=1$ and $b_{j,k}=0$, respectively, for $k=1, \ldots, M_c$. As the sets depend on the demapping rule and the bit position within the symbol, the related HW structure may not be straightforward.

An embodiment of a DMU architecture solves the above described issue and is based on a two-step process. First, and during the whole constellation sweeping process, the ED metrics are minimized and stored in corresponding registers as a function of the associated PAM value of the reference layer (two independent minimizations for both I and Q for a total of 2M registers).

A symbol demapping flow of operations is shown as an example in FIG. 17 for $N_{ED}$=16 and $M^2$=64 (64-QAM constellation), where during the constellation sweeping:

At each clock cycle, registers store the minimum ED over the set of possible I values and Q values, separately (M=8 registers per axis in this example).

As the sweeping is performed evaluating M=8 ED metrics for as many I candidate values and a constant Q in the two directions, this means that for every I PAM value a minimum out of two inputs is computed (i.e. the recent value is compared with the old one stored in the register). For every Q value, M different ED metrics are compared.

Once the minimum EDs for each PAM element have been found, the DMU of FIG. 13 performs bit demapping according to a given input mapping (and demapping counterpart) rule. The LLR corresponding to a given bit of the I (or Q) component is determined by performing a further minimization of the M/2 values stored in the corresponding registers.

In an embodiment, each DMU performs bit demapping according to the well-known Gray mapping rule, though it is intended that any bit mapping rule could be used without limiting the scope of the present disclosure.

It is noted that in an embodiment, potentially a most critical part of the DU, and even of the whole detector architecture in terms of HW complexity, is represented by the computation of the set of ED metrics. This is due to the fact that the ED is obtained as the summation of 2T squares, and for a given number S of EDs to be computed per layer, ST such multiplications are computed. This consideration may make it particularly important to consider alternative embodiments to reduce the mentioned computational burden.

A possible alternative LSU approximates the ED metrics (9) by replacing the $l^2$-norm (denoted as $\| \|^2$) with the less complex $l^1$-norm:

$$T_{ED}(x) = \|\tilde{y} - \tilde{R}x\|_t^1, t=1,\ldots,T \quad (21)$$

where $$\|A\|^1 = \sum_j |a_j|,$$

A being a generic vector and $a_j$ its entries.

An alternative embodiment of the LSU applicable to OFDM-based systems allows achieving scalability of complexity versus performance and for a careful tuning of the parameters, considerable area reduction at the expense of negligible performance degradation may be obtained. The embodiment consists of a HW architecture of LSU implementing the LCS demodulation method (7)-(11).

An embodiment of the LCS demodulation method consists of:

QAM/PSK symbols taken from constellations of size equal to or higher than a determined amount (named for brevity "CASE-A") are demodulated through LCS for a majority of OFDM sub-carriers in an OFDM symbol. LCS corresponds to searching square subsets of $n^2$ symbols, where n is a natural integer.

QAM/PSK symbols taken from constellations of size lower than said determined amount (named for brevity "CASE-B") are always demodulated through FCS.

A given number of OFDM sub-carriers, selected for example on the basis of a given selection criterion, are demodulated through FCS also in case of symbols taken from CASE-A constellations.

In an embodiment, said selection criterion is based on the worst case channel fading conditions as exemplified per above.

Figures 18A, 18B:
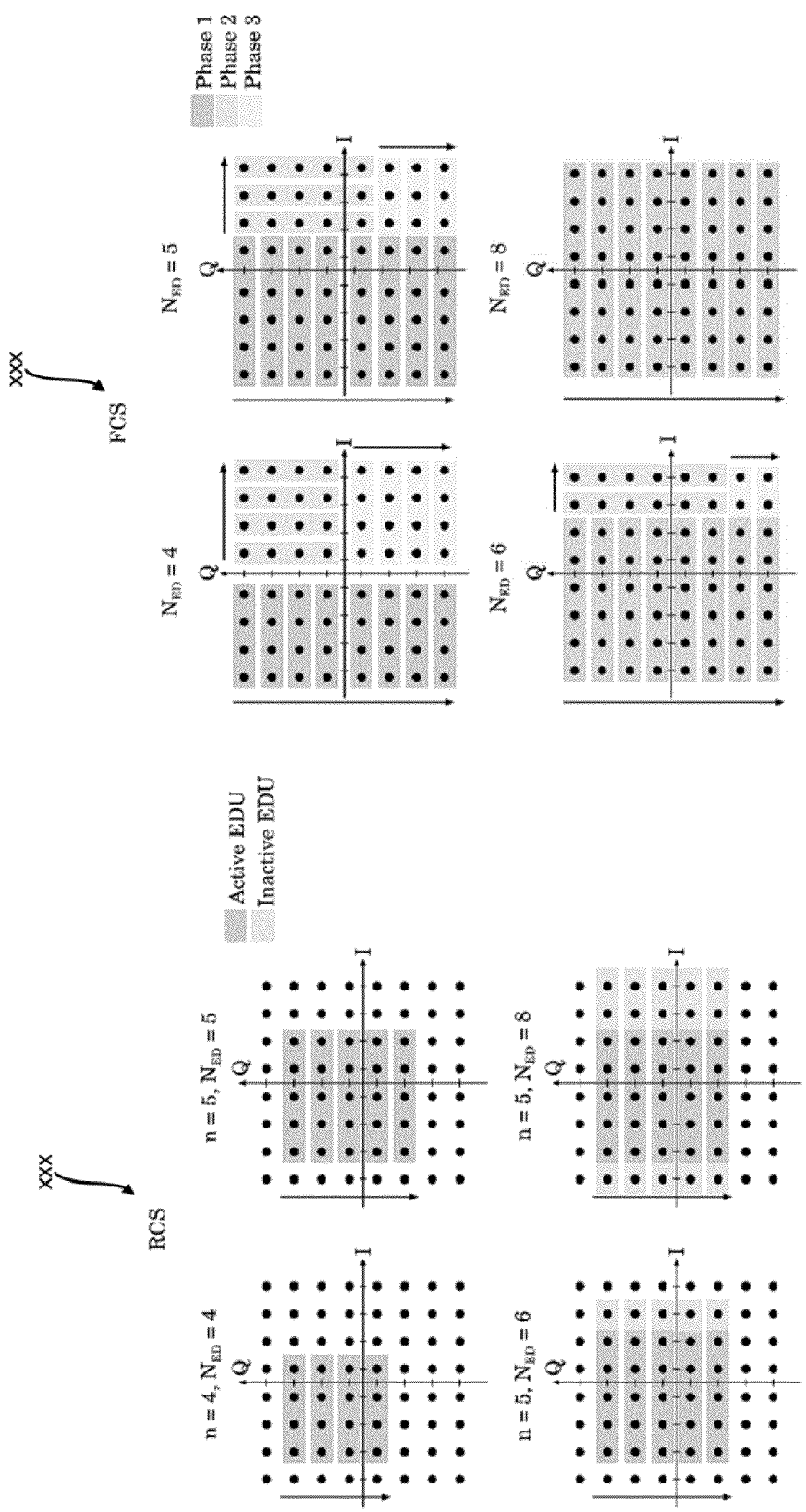
FIGS. 18A and 18B illustrates a constellation sweeping method in accordance with an embodiment of this disclosure.

LCS is shown in FIG. 18A. For a given n, $N_{ED} \geq n$ are instantiated. They work in parallel and process symbols along rows, one per clock cycle. Then, n clock cycles are required to span $n^2$ points. It is noted that $(N_{ED}-n)$ EDUs do not need to remain active and may be disabled in order to save power.

If FCS is to be performed for CASE-A $M^2$-QAM constellations, and if $N_{ED}$<M EDUs are instantiated, a regular constellation sweeping process may not be possible; an efficient option (minimizing the number of required clock cycles required to complete the process) is illustrated in FIG. 18B for M=8 64-QAM) and four possible LSU architecture embodiments employing $N_{ED}$=4,5,6 and 8 respectively. As an example, the process may be divided into three phases, identified by the arrows showing the direction of processing and by the related subsets of symbols having different colour in figure:

1. the constellation is spanned starting from the top left corner for M clock cycles along axis Q i.e. at each clock cycle a constant PAM value of the Q component and $N_{ED}$ different PAM values of the I component are provided to the EDUs.
2. Then, the top right square is processed i.e. sweeping occurs along I and Q axes in a reverse order compared to the former step. The duration of this phase is $(M-N_{ED})$ clock cycles.
3. Finally, the bottom right corner of the constellation is processed, for a total of $(M-N_{ED})$ clock cycles.

The whole constellation sweeping duration is $N_{c,H}$=3·M−2·$N_{ED}$ clock cycles.

As a matter of example, Table 1 summarizes the LSU latencies for $N_{ED}$ ranging from 4 to 8 based on the above-mentioned constellation sweeping method and on (7)-(11). The used parameters are those deriving from specifications [1] and 64-QAM; also, $f_{clk}$=80 MHz and $L_c$=4 μs have been used.

TABLE 1

| $N_{ED}$ | $n^2$ | $N_{c,H}$ | $N_H$ | $N_{c,avg}$ |
|---|---|---|---|---|
| 4 | 16 | 16 | 8 | 5.84 |
| 5 | 25 | 14 | 5 | 5.86 |
| 6 | 25 | 12 | 7 | 5.94 |
| 8 | 25 | 8 | 17 | 5.98 |

As a proof of concept, Table 2 reports the VLSI area results obtained using alternative LSUs implementing the two constellation sweeping processes previously described. The area estimates refer to 65 nm CMOS technology. An embodiment of the LCS architecture achieves area reduction of 63% compared to the FCS case.

TABLE 2

| LSU architecture | FC ($N_{ED}$ = 16) | LCS ($N_{ED}$ = 5) |
|---|---|---|
| Area [mm$^2$] | 0.66 | 0.24 |

As previously stated, the LLR reliability may be improved extending the number of candidate transmit sequences, see (13). A potential drawback is the introduction of interdependence between the T minimizations performed by the LSU in order to compute the LLRs of the bits corresponding to the T symbols transmitted by the related transmit antennas.

The related operations are included in the "cross demapping unit" (CDU) unit of FIG. 13. The operations performed by the unit refer to above, meaning that a given LSU, when computing the EDs over a given set of candidate symbols for a reference layer, keep track of the minimum found ED value also as function of the estimate value for the non-reference layers. Such estimate values are not known a-priori in general and are determined at run-time, for example through spatial DFE starting from the candidate value of the reference layer, as of an embodiment described previously.

Figure 19:
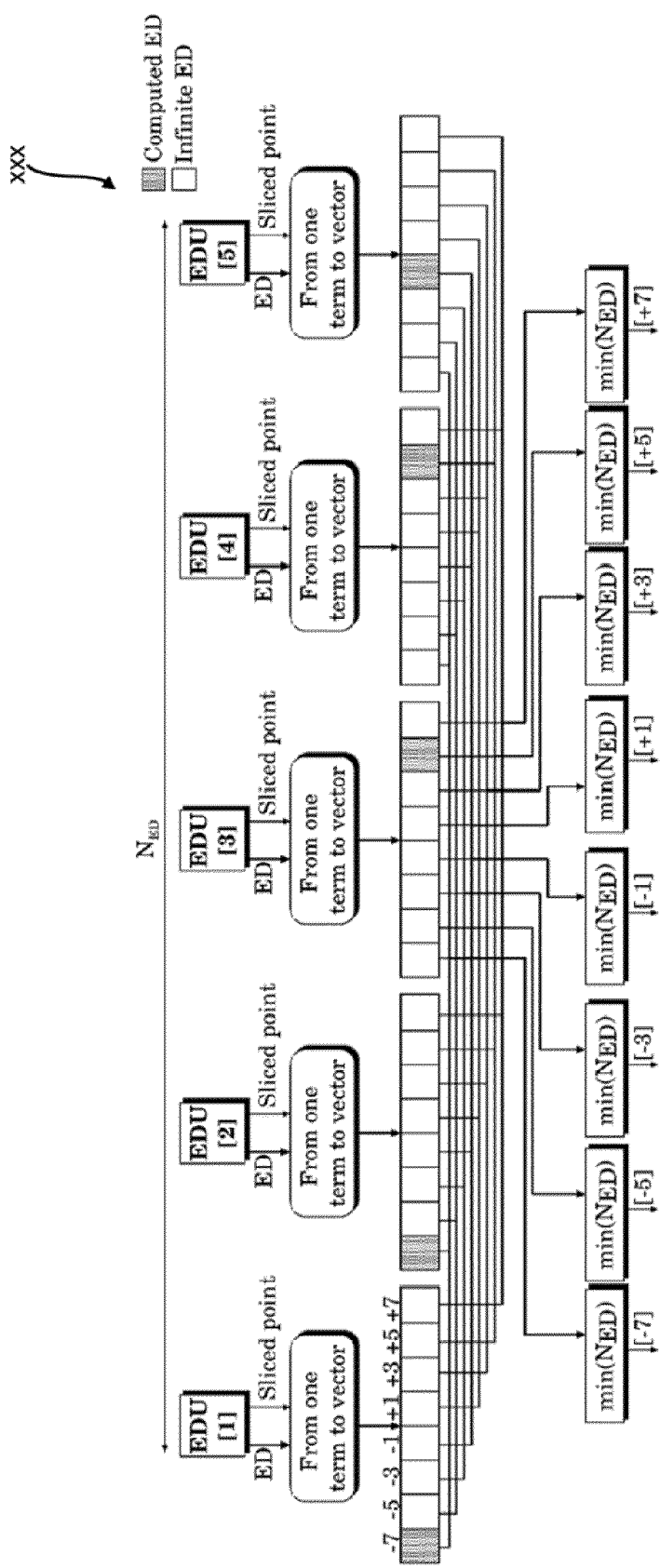
FIG. 19 illustrates an architecture for the cross demapping of the Euclidean Distances associated with a "slicing" operation in accordance with an embodiment of this disclosure.

An embodiment for the core operations of the CDU is shown in FIG. 19 with reference to T=2, though generalization to higher T is straightforward. The architecture associates with each of the $N_{ED}$ ED values, a M-cell vector for each of the T−1 non-reference transmit symbols (one cell for each possible PAM value of the corresponding symbol estimate). Each ED value is stored into the cells corresponding to the related non-reference layer PAM value estimates (the other M−1 cells are filled with an initialisation value). Then, M comparators processing $N_{ED}$ inputs each, compare the values stored in the cells associated with a same PAM value and output M minimum ED values, one for each possible PAM value. At the end of the constellation sweeping process for a reference layer, the minimum ED associated with the PAM values of the non-reference layer estimates will be also stored in the M cells.

A last operation performed by the CDU, prior to LLRs computation, may be the cross-comparison of the minimum ED values associated with the PAM values of the reference layers output by the LSU as a result of the constellation sweeping, with the values stored in the corresponding cells determined as a consequence of the cross-demapping operations described above. The final minimum values, one for each PAM element, will be the output values of the CDU to be passed to the DMU.

The throughput θ achievable by the DU architecture employing a $N_{LSU}$ LSUs, generating $N_{LRR}=M_c$ parallel LLRs and for a working clock frequency $f_{clk}$, can be expressed as:

$$\theta = N_{LSU} \cdot N_{LLR} / N_{c,avg} \cdot f_{clk} \quad (22)$$

where it has been assumed that each EDU includes $N_{PED}=T$ PEDUs. It is recalled that $N_{c,avg}$ is the average number of clock cycles employed to demodulate an OFDM sub-carrier (for an example, see Table 1).

From the above considerations, some properties of an embodiment of the DU architecture are highlighted:
1. It is parameterizable in terms of the supported modulation orders and number of transmit antennas; moreover, an LCS embodiment is also flexible in terms of the size of the symbol sub-set to be searched for the demodulation.
2. It is parallelizable with respect to the number of transmit antennas, and at lower level, in terms of the number of constellation symbols to be processed simultaneously (i.e. in terms of the instantiated EDUs, $N_{ED}$).
3. It is characterized by a scalable complexity to larger MIMO dimensions based on the basic modules (as a straightforward example, additional parallel LSUs may be instantiated and each EDU may be extended by including more PEDUs if T is increased).
4. Moreover, once T is set, an LCS embodiment is also characterized by a scalable complexity and performance trade-off, which then becomes a designer's choice. To be more specific, for a given constellation size $M^2$, multiple choices of the symbol sub-set size ($n^2$) and the related value of $N_{ED}$ are supported.

Overall, it is noted that embodiments of a HW architecture of a soft-output near-ML MIMO detector characterized by properties desirable for high data rate VLSI implementations have been disclosed.

In particular, as a consequence of the already highlighted features of the embodiments of the sub-units, also embodiments of said architecture are overall characterized by:
1. Parameterizability in terms of the supported modulation orders and number of transmit antennas.
2. Parallelizability with respect to the number of transmit antennas. Moreover a customization of the level of parallelism intrinsic to the DU is possible as described in details previously.
3. Scalability to larger MIMO dimensions based on the basic 2×2 modules. Moreover, a customization of the complexity entailed by the DU is possible according to an embodiment described in detail previously, representing an additional scalability in terms of complexity and performance trade-off.

Compared to the state of the art, a HW architecture of a near-optimal soft-output MIMO detector characterized by scalability in terms of the number of transmit antennas, high throughput, low complexity, flexibility versus the supported modulation order has been disclosed.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

LIST OF REFERENCES

[1] A. Stephens et al, "Draft Amendment to [ . . . ]—Part 11: Wireless LAN Medium Access Control (MAC) and Physical Layer (PHY) specifications: Enhancements for Higher Throughput", IEEE P802.11n™/D8.0.
[2] Patent application no. WO2007012053 (publ. date 25 Jan. 2007), M. Siti, M. Fitz, "Apparatus And Method For Detecting Communications From Multiple Sources".
[3] M. Siti and M. P. Fitz, "A novel soft-output layered orthogonal lattice detector for multiple antenna communications", Proc. IEEE Int. Conf. on Communications, June, 2006.
[4] C. Studer, A. Burg, and H. Bölcskei, "Soft-Output Sphere Decoding: Algorithms and VLSI Implementation", IEEE Journal On Selected Areas In Communications, Vol. 26, No. 2, February 2008.
[5] S. Chen, and T. Zhang, "Low Power Soft-Output Signal Detector Design for Wireless MIMO Communication System", ISLPED'07, Aug. 27-29, 2007, Portland, Oreg., USA.

The invention claimed is:
1. A device, comprising:
a module for detecting and generating bit soft-output information of transmit sequences of digitally modulated transmit symbols taken from an input discrete set, said transmit symbols being transmitted by T multiple transmitting antennas and received by R multiple receiving antennas, whereby said multiple transmitting antennas and said multiple receiving antennas jointly define an equivalent transmission channel modelled by a channel estimate matrix and said received symbols are grouped as an equivalent received vector, which can include symbols transmitted and received in multiple time instants, as well as the related channel estimates coefficients, and wherein the device further includes a number of sub-units, including:

a channel estimate pre-processing unit which computes T linear transformations of the type $R_j=A_jH_j, j=1,\ldots,T$ of as many column-wise re-ordered versions ($H_j$) of said channel estimate matrix H, where $A_j$ is a matrix converting $H_j$ in a triangular matrix $R_j$, wherein the ordering of the columns of $H_j$ corresponds to an ordering of the transmit symbols in the sequence $X_j$, and where each ordering differs from the other for the index value in the last position, considered as "reference layer", so that all T layers become in turn the reference layer in one sequence $X_j$ once and only once;

a received vector processing unit which generates T processed received vectors using the results of said channel estimate pre-processing unit and namely computes $Y_j'=A_jY, j=1,\ldots,T$;

a demodulation and soft-output generation unit that performs at least the following steps, to be repeated for $j=1,\ldots,T$:

determining a set of candidate transmitted sequences $\hat{x}_j$, each an estimate of $X_j$, obtained by a group partitioning where:

a set of candidate symbols of the reference layer is first selected according to a given strategy;

for each candidate symbol of the reference layer, the remaining symbol estimates are derived recursively starting from the candidate symbol;

computing the Euclidean Distance terms $$T_{ED}=\|Y_j'-R_j\hat{X}_j\|^2$$

for each $\hat{x}_j$ of said set of candidate transmitted sequences, wherein $\|\ \|^2$ denotes the $l^2$-norm of the argument;

computing the bit soft output information of the bits corresponding to the symbol transmitted by the j-th transmit antenna.

2. The device of claim 1, wherein

X includes a complex vector whose entries, the equivalent transmitted symbols, are complex values belonging to a complex constellation S with $2^{Mc}$ possible signal points, Y includes a complex equivalent received vector of symbols, H includes a complex matrix, and X, Y, and H are related by a linear relation of the type $$Y=HX+N$$

where N is a noise complex vector.

3. The device of claim 1 wherein the device includes:

scalable complexity to larger MIMO dimensions, including the number of transmit antennas or receive antennas based on basic modules;

parallelizable architecture, wherein the device is configured to be designed with a basic degree of parallelism determined by T, and is further customizable depending on the number of OFDM sub-carriers simultaneously processed if OFDM systems are considered;

parameterizability, with regard to constellation types to which the transmitted symbols belong, and the number of transmit and receive antennas.

4. The device of claim 1, wherein the channel estimate pre-processing unit is configured to compute T linear transformations $R_j=A_jH_j, j=1,\ldots,T$ where $Q_j\equiv A_j$ is an orthonormal matrix, $R_j$ is an upper triangular matrix and $H_j=Q_jR_j$, using T preferred orderings of the columns of $H_j$ that allows obtaining a scalable complexity with T.

5. The device of claim 1, wherein the channel estimate pre-processing unit is configured to compute T linear transformations $R_j=A_jH_j, j=1,\ldots,T$ where $Q_j\equiv A_j$ is an orthonormal matrix, $R_j$ is an upper triangular matrix, and $H_j=Q_jR_j$, independently and with no processing sharing between them.

6. The device of claim 1, wherein the received vector processing unit is configured to compute T processed received vectors $Y_j'=Q_j^TY, j=1,\ldots,T$, where $Q_j^T$ denotes the transpose conjugate of the orthonormal matrix $Q_j$.

7. The device of claim 1, wherein the demodulation and soft-output generation unit are configured to compute the Euclidean Distance terms and the bit soft output information by any number of lattice search units from 1 to T, said number of lattice search units also being configured to determine the parallelism degree of the demodulation and soft-output generation unit, that, in addition, for each reference layer, is configured to select all the constellation symbols of an input constellation as candidate symbols of said layer.

8. The device of claim 1, wherein the demodulation and soft-output generation unit is configured to compute the Euclidean Distance terms by using a scalable number of Euclidean Distance units each one in charge of computing a Euclidean Distance in a given number of clock cycles, and includes any number of partial Euclidean Distance units from 1 to T, each partial Euclidean Distance unit being one square out of the T squares summed together to give $T_{ED,j}$.

9. The device of claim 1, wherein the demodulation and soft-output generation unit is configured to compute the bit soft output information of the bits corresponding to the symbol transmitted by the j-th transmit antenna with a demapping unit that is configured to compute log-likelihood ratios:

$$L(b_{j,k}\mid Y_j')=\min_{\{X_{j,T}\}\in S(k)_j^-}T_{ED,j}[\hat{X}_j]-\min_{\{X_{j,t}\}\in S(k)_j^+}T_{ED,j}[\hat{X}_j]$$

where $b_{j,k}$ ($k=1,\ldots,M_c$) are the bits belonging to the reference layer symbol $X_{j,T}$ of the sequence $\hat{x}_j$, and $S(k)_j^+, S(k)_j^-$ represent the sets of symbols of the reference layer having $b_{j,k}=1$ and $b_{j,k}=0$, respectively.

10. The device of claim 1, wherein the demodulation and soft-output generation unit is configured to derive the remaining symbol estimate by, computing the remaining symbol estimates through spatial decision-feedback equalization starting from the value of the reference layer.

11. The device of claim 1, wherein minimizations involved in an LLR computation are based on a two-step process, where first symbol demapping takes place, followed then by bit demapping of a fixed number of EDs.

12. The device of claim 1, wherein minimizations involved in an LLR computation are further extended through cross-comparison corresponding to the operations described by a cross demapping unit.

13. The device of claim 1, wherein
said computing the Euclidean Distance (ED) terms is approximated by the following metric:

$$T_{ED} = \|Y'_j - R_j \hat{X}_j\|_{l^1}$$

wherein $\|\ \|_{l^1}$ denotes the $l^1$-norm of the argument.

14. A method for a low complexity generation of near optimal bit soft output information based on a reduced candidate search, the method comprising a series of steps to reduce cardinality of symbol sets of a reference layer $S(k)_i^+$, $S(k)_i^-$, i=1, ..., T, having $b_{j,k}=1$ and $b_{j,k}=0$, respectively, to subsets, in the equation:

$$L(b_{j,k} \mid Y'_j) = \min_{\{X_{j,T}\} \in S(k)_j^-} T_{ED,j}[\hat{X}_j] - \min_{\{X_{j,T}\} \in S(k)_j^+} T_{ED,j}[\hat{X}_j]$$

the steps including:
determining a Zero Forcing (ZF) Decision Feedback Equalization (DFE) estimate for the I and Q of the reference layer;
determining a given number n of PAM values for the I and Q of the reference layer symbol candidates as the closest n values to the initial ZF estimate;
where OFDM systems are considered, and sub-carriers are divided in two groups according to a given sub-carrier selection method, based on channel fading conditions to determine a number $N_H$ of sub-carriers to be demodulated using the whole set $S(k)_i^+, S(k)_i^-$ and a number $N_L$ to be demodulated through the reduced complexity; such that:
for each carrier index h=1, ... $N_{DC}$, assign to the fading coefficient r(h) the worst case value over the set of transmit antenna indexes comprises:

$$r(h) = \min_{t=1,\ldots T} \{\tilde{R}^{(t)}_{2T,2T}(h)\}$$

and
the $N_H$ carrier indexes corresponding to the $N_H$ lowest values of r(h) are determined, and the $N_L$ are the remaining ones.

15. A device, comprising:
a module for detecting and generating bit soft-output information of transmit sequences of digitally modulated transmit symbols taken from an input discrete set, said transmit symbols being transmitted by T multiple transmitting antennas and received by R multiple receiving antennas, whereby said multiple transmitting antennas and said multiple receiving antennas jointly define an equivalent transmission channel modelled by a channel estimate matrix and said received symbols are grouped as an equivalent received vector, which can include symbols transmitted and received in multiple time instants, as well as the related channel estimates coefficients, and wherein the device further includes a number of sub-units, including:
a channel estimate pre-processing unit which computes T linear transformations of the type $R_j = A_j H_j$, j=1, ..., T of as many column-wise re-ordered versions ($H_j$) of said channel estimate matrix H, where $A_j$ is a matrix converting $H_j$ in a triangular matrix $R_j$,
wherein the ordering of the columns of $H_j$ corresponds to an ordering of the transmit symbols in the sequence $X_j$, and
where each ordering differs from the other for the index value in the last position, considered as "reference layer", so that all T layers become in turn the reference layer in one sequence $X_j$ once and only once;
a received vector processing unit which generates T processed received vectors using the results of said channel estimate pre-processing unit and namely computes $Y'_j = A_j Y$, j=1, ..., T;
a demodulation and soft-output generation unit that performs at least the following steps to be repeated for j=1, ..., T:
determining a set of candidate transmitted sequences $\hat{x}_j$, each an estimate of $X_j$, obtained by a group partitioning where:
a set of candidate symbols of the reference layer is first selected according to a given strategy;
for each candidate symbol of the reference layer, the remaining symbol estimates are derived recursively starting from the candidate symbol;
computing the Euclidean Distance terms $$T_{ED} = \|Y'_j - R_j \hat{X}_j\|^2$$

for each $\hat{x}_j$ of said set of candidate transmitted sequences, wherein $\|\ \|^2$ denotes the $l^2$-norm of the argument;
computing the bit soft output information of the bits corresponding to the symbol transmitted by the j-th transmit antenna;
wherein the demodulation and soft-output generation unit are configured to determine a set of candidate transmitted sequences and to compute the Euclidean Distance terms by any number of lattice search units from 1 to T, said number also determining the parallelism degree of the demodulation and soft-output generation unit, that for each reference layer, select a subset of the constellation symbols of an input constellation as candidate symbols of said layer by dividing into two groups sub-carriers according to a given sub-carrier selection method, based on channel fading conditions, to determine a number $N_H$ of sub-carriers to be demodulated using the whole set $S(k)_i^+, S(k)_i^-$ and a number $N_L$ to be demodulated through the reduced complexity, such that for each carrier index h=1, ..., $N_{DC}$, the demodulation and soft-output generation unit assigns to the fading coefficient r(h) the worst case value over the set of transmit antenna indexes according to $$r(h) = \min_{t=1,\ldots T} \{\tilde{R}^{(t)}_{2T,2T}(h)\}$$

and
wherein the demodulation and soft-output generation unit determines the $N_H$ carrier indices corresponding to the $N_H$ lowest values of r(h), and the $N_L$ carrier indices remain.

16. A method, comprising:
receiving respective signals from multiple transmit antennas over a channel having a response, the signals together representing a symbol;
generating first distances each corresponding to a respective possible value of represented by one of the signals in response to a first channel-response coefficient that is associated with the one signal;
generating for each first distance an associated set of second distances each corresponding to a respective possible value represented by another of the signals in response to a second channel-response coefficient that is associated with the other signal;

identifying candidates for the symbol, each candidate equal to a combination of a respective one of the first values and second value from a corresponding set such that a sum of the first distance associated with the first value and the second distance associated with the second value is a minimum of all such sum associated with the first and second values; and generating a soft-output for each bit of the symbol in response to a difference between minimum of the sums associated with the candidates having a first value of the bit and a minimum of the sums associated with the candidates having a second value of the bit.

17. The method of claim 16 wherein receiving the signals includes receiving the signals with at least one receive antenna.

18. The method of claim 16 wherein each first distance and each second distance includes a respective Euclidean Distance.

* * * * *